(12) United States Patent
Booker

(10) Patent No.: US 12,527,600 B2
(45) Date of Patent: Jan. 20, 2026

(54) MEDICAL DEVICES THAT INCLUDE A TRIGGER ASSEMBLY FOR A ROTATABLE CATHETER AND METHODS OF USE

(71) Applicant: Merit Medical Systems, Inc., South Jordan, UT (US)

(72) Inventor: Robert Booker, Vandergrift, PA (US)

(73) Assignee: Merit Medical Systems, Inc., South Jordan, UT (US)

(*) Notice: Subject to any disclaimer, the term of this patent is extended or adjusted under 35 U.S.C. 154(b) by 463 days.

(21) Appl. No.: 17/876,643

(22) Filed: Jul. 29, 2022

(65) Prior Publication Data

US 2023/0034746 A1 Feb. 2, 2023

Related U.S. Application Data

(60) Provisional application No. 63/227,008, filed on Jul. 29, 2021.

(51) Int. Cl.
*A61B 17/34* (2006.01)
*A61B 17/00* (2006.01)
*A61N 1/372* (2006.01)

(52) U.S. Cl.
CPC ............. *A61B 17/3468* (2013.01); *A61B 2017/00292* (2013.01); *A61B 2017/00367* (2013.01); *A61N 1/372* (2013.01)

(58) Field of Classification Search
CPC ...... A61B 17/3468; A61B 2017/00292; A61B 2017/00367; A61N 1/372
See application file for complete search history.

(56) References Cited

U.S. PATENT DOCUMENTS

| 1,080,554 A | 12/1913 | Hopkins |
| 3,521,620 A | 7/1970 | Cook |
| 3,631,848 A | 1/1972 | Muller |

(Continued)

FOREIGN PATENT DOCUMENTS

| CA | 2403030 A1 | 3/2003 |
| CN | 108348747 | 7/2018 |

(Continued)

OTHER PUBLICATIONS

Miyazaki et al., "A trial study of RhinoSleep for the diagnosis of sleep apnea", Sleep Breathing Disorders, Psychiatry and Clinical Neurosciences, 2001, vol. 55, pp. 249-250.

(Continued)

*Primary Examiner* — Tan-Uyen T Ho
*Assistant Examiner* — Cherie M Poland
(74) *Attorney, Agent, or Firm* — Dorsey & Whitney LLP

(57) ABSTRACT

Medical devices that include a trigger assembly for a rotatable catheter and methods of use are described. An example medical device includes a housing, a catheter, a drive assembly, and a trigger assembly. The trigger assembly is partially disposed within the housing and includes a trigger, a drive initiator, a drive member, a flip drive, and a biasing member. The trigger is moveable between a first position and a second position relative to the housing. The flip drive is moveable between a neutral position, a first drive position, and a second drive position. The drive assembly moves relative to the housing when the flip drive is in the first drive position and the trigger is moved from its first position to its second position.

20 Claims, 10 Drawing Sheets

(56) References Cited

U.S. PATENT DOCUMENTS

| | | | |
|---|---|---|---|
| 4,038,985 A | 8/1977 | Chiulli |
| 4,719,924 A | 1/1988 | Crittenden et al. |
| 4,726,374 A | 2/1988 | Bales et al. |
| 4,886,067 A | 12/1989 | Palermo |
| 4,898,577 A | 2/1990 | Badger et al. |
| 4,917,085 A | 4/1990 | Smith |
| 5,030,204 A | 7/1991 | Badger et al. |
| 5,125,395 A | 6/1992 | Adair |
| 5,185,004 A | 2/1993 | Lashinski |
| 5,254,088 A | 10/1993 | Lundquist et al. |
| 5,306,272 A | 4/1994 | Cohen et al. |
| 5,308,318 A | 5/1994 | Plassche, Jr. |
| 5,327,906 A | 7/1994 | Fideler |
| 5,380,305 A | 1/1995 | Ghouri |
| 5,419,764 A | 5/1995 | Roll |
| 5,441,483 A | 8/1995 | Avitall |
| 5,460,616 A | 10/1995 | Weinstein et al. |
| 5,522,400 A | 6/1996 | Williams |
| 5,642,736 A | 7/1997 | Avitall |
| 5,651,781 A | 7/1997 | Grace |
| 5,685,858 A | 11/1997 | Kawand |
| 5,738,664 A | 4/1998 | Erskine et al. |
| 5,865,800 A | 2/1999 | Mirarchi et al. |
| 5,908,403 A | 6/1999 | Bosma et al. |
| 5,916,214 A | 6/1999 | Cosio et al. |
| 5,941,849 A | 8/1999 | Amos et al. |
| 5,980,545 A | 11/1999 | Pacala et al. |
| 5,989,241 A | 11/1999 | Plishka et al. |
| 6,007,519 A | 12/1999 | Rosselli |
| 6,126,649 A | 10/2000 | VanTassel et al. |
| 6,126,654 A | 10/2000 | Giba et al. |
| 6,159,177 A | 12/2000 | Amos, Jr. et al. |
| 6,231,542 B1 | 5/2001 | Amos et al. |
| 6,500,167 B1 | 12/2002 | Webster, Jr. |
| 6,530,913 B1 | 3/2003 | Giba et al. |
| 6,533,783 B1 | 3/2003 | Tollner |
| 6,554,794 B1 | 4/2003 | Mueller et al. |
| 6,572,610 B2 | 6/2003 | Kovalcheck et al. |
| 6,673,060 B1 | 1/2004 | Fleming, III |
| 6,755,812 B2 | 6/2004 | Peterson et al. |
| 6,926,669 B1 | 8/2005 | Stewart et al. |
| 7,037,290 B2 | 5/2006 | Gardeski et al. |
| 7,087,038 B2 | 8/2006 | Lee |
| 7,192,415 B2 | 3/2007 | Sauvageau |
| 7,217,256 B2 | 5/2007 | Di Palma |
| 7,269,453 B2 | 9/2007 | Mogul |
| 7,351,222 B2 | 4/2008 | Sauvageau |
| 7,503,914 B2 | 3/2009 | Coleman et al. |
| 7,615,044 B2 | 11/2009 | Scheibe et al. |
| 7,641,630 B2 | 1/2010 | Accisano, III et al. |
| 7,706,894 B2 | 4/2010 | Stewart et al. |
| 7,736,331 B2 | 6/2010 | Accisano, III et al. |
| 7,740,608 B2 | 6/2010 | Lampropoulos et al. |
| 7,803,130 B2 | 9/2010 | Ryan et al. |
| 7,909,814 B2 | 3/2011 | Accisano, III et al. |
| 7,935,082 B2 | 5/2011 | Datta et al. |
| 7,935,108 B2 | 5/2011 | Baxter et al. |
| 7,959,601 B2 | 6/2011 | McDaniel et al. |
| 7,959,644 B2 | 6/2011 | Shriver |
| 8,070,693 B2 | 12/2011 | Ayala et al. |
| 8,083,879 B2 | 12/2011 | Swinehart et al. |
| 8,118,803 B1 | 2/2012 | Chow |
| 8,177,773 B2 | 5/2012 | Ovcharchyn et al. |
| 8,182,467 B2 | 5/2012 | Nguyen et al. |
| 8,353,953 B2 | 1/2013 | Giannetti et al. |
| 8,369,923 B2 | 2/2013 | de la Rama et al. |
| 8,425,466 B2 | 4/2013 | Sargent, Jr. |
| 8,430,864 B2 | 4/2013 | Schultz |
| 8,496,645 B2 | 7/2013 | Eells et al. |
| 8,535,310 B2 | 9/2013 | Hardin, Jr. et al. |
| 8,535,349 B2 | 9/2013 | Chen et al. |
| 8,562,568 B2 | 10/2013 | Datta et al. |
| 8,657,805 B2 | 2/2014 | Peh et al. |
| 8,706,260 B2 | 4/2014 | Stewart et al. |
| 8,734,426 B2 | 5/2014 | Ahmed et al. |
| 8,758,231 B2 | 6/2014 | Bunch et al. |
| 8,961,551 B2 | 2/2015 | Taylor |
| 9,028,520 B2 | 5/2015 | Taylor et al. |
| 9,079,006 B1 * | 7/2015 | Ovcharchyn ...... A61M 25/0097 |
| 9,107,691 B2 | 8/2015 | Fojtik |
| 9,198,643 B2 | 12/2015 | Bookbinder et al. |
| 9,220,531 B2 | 12/2015 | Datta et al. |
| 9,271,702 B2 | 3/2016 | Bacher et al. |
| 9,289,226 B2 | 3/2016 | Taylor |
| 9,345,863 B2 | 5/2016 | Yamazaki et al. |
| 9,380,930 B2 | 7/2016 | Oskin et al. |
| D765,243 S | 8/2016 | Halbert et al. |
| D770,616 S | 11/2016 | Halbert et al. |
| 9,545,500 B2 | 1/2017 | Datta et al. |
| 9,550,041 B2 | 1/2017 | Bedell |
| 9,603,618 B2 | 3/2017 | Grace et al. |
| 9,801,650 B2 | 10/2017 | Taylor et al. |
| 9,808,275 B2 | 11/2017 | Taylor |
| D806,245 S | 12/2017 | Halbert et al. |
| 9,844,371 B2 | 12/2017 | Scirica et al. |
| 9,907,570 B2 | 3/2018 | Osypka et al. |
| 9,913,684 B2 | 3/2018 | Osypka |
| 9,913,963 B2 | 3/2018 | Bedell |
| 9,918,737 B2 | 3/2018 | Carver et al. |
| 9,925,366 B2 | 3/2018 | Grace et al. |
| 9,937,323 B2 | 4/2018 | Schaeffer |
| D819,204 S | 5/2018 | Halbert et al. |
| 9,956,399 B2 | 5/2018 | Carver et al. |
| 9,980,743 B2 | 5/2018 | Grace et al. |
| 10,052,129 B2 | 8/2018 | Grace et al. |
| 10,130,242 B2 | 11/2018 | Ostrovsky et al. |
| 10,136,913 B2 | 11/2018 | Grace et al. |
| 10,238,838 B2 | 3/2019 | Datta et al. |
| 10,314,615 B2 | 6/2019 | Carver et al. |
| D854,682 S | 7/2019 | Halbert et al. |
| 10,413,702 B2 | 9/2019 | Gray et al. |
| 10,448,999 B2 | 10/2019 | Schneider |
| D870,279 S | 12/2019 | Halbert et al. |
| 10,524,817 B2 | 1/2020 | Grace |
| 10,532,207 B2 | 1/2020 | Kalmann et al. |
| 10,537,354 B2 | 1/2020 | Taylor |
| 10,682,496 B2 | 6/2020 | Beeckler et al. |
| 10,751,529 B2 | 8/2020 | Grace et al. |
| 10,842,532 B2 | 11/2020 | Grace et al. |
| 10,849,603 B2 | 12/2020 | Grace et al. |
| 10,993,741 B2 | 5/2021 | Grace et al. |
| 11,160,579 B2 | 11/2021 | Grace et al. |
| 2002/0115983 A1 | 8/2002 | Sekino et al. |
| 2002/0120250 A1 | 8/2002 | Altman |
| 2003/0004460 A1 | 1/2003 | Bedell |
| 2003/0032927 A1 | 2/2003 | Halseth et al. |
| 2003/0195467 A1 | 10/2003 | Mickley |
| 2005/0197623 A1 | 9/2005 | Leeflang et al. |
| 2005/0256452 A1 | 11/2005 | DeMarchi et al. |
| 2006/0063973 A1 | 3/2006 | Makower et al. |
| 2006/0235431 A1 * | 10/2006 | Goode ............... A61B 17/3468 |
| | | 606/108 |
| 2007/0093781 A1 | 4/2007 | Kugler et al. |
| 2007/0142846 A1 * | 6/2007 | Catanese ............... A61F 2/0063 |
| | | 606/142 |
| 2007/0156224 A1 | 7/2007 | Cioanta et al. |
| 2007/0219464 A1 | 9/2007 | Davis et al. |
| 2007/0250105 A1 | 10/2007 | Ressemann et al. |
| 2008/0015625 A1 | 1/2008 | Ventura et al. |
| 2008/0097154 A1 | 4/2008 | Makower et al. |
| 2008/0125756 A1 | 5/2008 | Dicarlo et al. |
| 2008/0243067 A1 | 10/2008 | Rottenberg et al. |
| 2009/0043299 A1 | 2/2009 | Racz |
| 2009/0198153 A1 | 8/2009 | Shriver |
| 2010/0030262 A1 * | 2/2010 | McLean ............... A61B 17/0401 |
| | | 606/232 |
| 2010/0099946 A1 | 4/2010 | Jenkins et al. |
| 2010/0240951 A1 * | 9/2010 | Catanese, III ...... A61B 17/0469 |
| | | 600/104 |
| 2010/0280316 A1 | 11/2010 | Dietz et al. |
| 2011/0040269 A1 | 2/2011 | Cline |
| 2011/0270169 A1 | 11/2011 | Gardeski |
| 2011/0270170 A1 | 11/2011 | Gardeski |
| 2012/0046664 A1 | 2/2012 | McGuckin, Jr. et al. |

(56) References Cited

U.S. PATENT DOCUMENTS

| | | |
|---|---|---|
| 2012/0265055 A1 | 10/2012 | Melsheimer et al. |
| 2013/0041314 A1 | 2/2013 | Dillon |
| 2013/0103001 A1 | 4/2013 | BenMaamer et al. |
| 2013/0103004 A1 | 4/2013 | Gray et al. |
| 2013/0238003 A1 | 9/2013 | Fischer et al. |
| 2014/0142594 A1 | 5/2014 | Fojtik |
| 2014/0350342 A1* | 11/2014 | Oskin .................. A61B 1/0051 600/118 |
| 2015/0105796 A1 | 4/2015 | Grace |
| 2015/0209062 A1 | 7/2015 | Taylor et al. |
| 2017/0105762 A1 | 4/2017 | Bloom et al. |
| 2017/0172622 A1 | 6/2017 | Grace et al. |
| 2018/0008301 A1 | 1/2018 | Taylor et al. |
| 2018/0161055 A1* | 6/2018 | Carver ............... A61B 17/3468 |
| 2018/0221055 A1 | 8/2018 | Grace et al. |
| 2018/0221625 A1 | 8/2018 | Schaeffer |
| 2018/0271551 A1 | 9/2018 | Grace et al. |
| 2019/0217061 A1 | 7/2019 | Datta et al. |
| 2019/0307988 A1 | 10/2019 | Spear et al. |
| 2019/0314608 A1 | 10/2019 | Della Vecchia |
| 2020/0237394 A1 | 7/2020 | Carver et al. |
| 2020/0297971 A1 | 9/2020 | Beeckler et al. |
| 2021/0038885 A1 | 2/2021 | Grace et al. |
| 2021/0128130 A1 | 5/2021 | Grace et al. |
| 2021/0259737 A1 | 8/2021 | Grace et al. |
| 2021/0307776 A1 | 10/2021 | Carver et al. |
| 2021/0338984 A1* | 11/2021 | Booker ............. A61M 25/0097 |
| 2022/0015792 A1 | 1/2022 | Grace et al. |
| 2022/0047292 A1 | 2/2022 | Rousso et al. |

FOREIGN PATENT DOCUMENTS

| | | |
|---|---|---|
| EP | 0163266 A2 | 12/1985 |
| EP | 2368481 A1 | 9/2011 |
| EP | 2522386 A3 | 3/2013 |
| EP | 2710949 A1 | 3/2014 |
| EP | 2967634 | 1/2016 |
| EP | 3113701 | 1/2017 |
| EP | 3113836 | 12/2018 |
| EP | 3341071 | 1/2020 |
| GB | 2465621 A | 6/2010 |
| JP | 6859009 | 4/2021 |
| JP | 7066025 | 5/2022 |
| WO | 9843530 | 10/1998 |
| WO | 0126726 A1 | 4/2001 |
| WO | 0170308 A1 | 9/2001 |
| WO | 03001986 A2 | 1/2003 |
| WO | 2006020180 A2 | 2/2006 |
| WO | 2008045242 A2 | 4/2008 |
| WO | 2011082074 A1 | 7/2011 |
| WO | 2011084655 A1 | 7/2011 |
| WO | 2013069019 A2 | 5/2013 |
| WO | 2014134257 A1 | 9/2014 |
| WO | 2014151814 | 9/2014 |
| WO | 2015134209 | 9/2015 |
| WO | 2015134383 | 9/2015 |
| WO | 2016099670 | 6/2016 |
| WO | 2017048486 | 3/2017 |
| WO | 2019005428 A1 | 1/2019 |

OTHER PUBLICATIONS

Entellus Medical Inc., XprESS, Multi-Sinus Dilation Tool, Instructions for Use, 2011, pp. 1-7.

Spectranetics, TightRail & TightRail Mini, Rotating Dilator Sheaths, "The Next Generation in Mechanical Lead Extraction Sheaths", brochure 2014.

Spectranetics, TightRail SUB-C, Rotating Dilator Sheath, "A Breakthrough in Lead Extraction", brochure 2017.

The partial European search report, Application No. 12194127.2, dated Apr. 9, 2013.

The extended European search report, Application No. 13185810.2, dated Jan. 7, 2014.

The extended European search report, Application No. 21171510.7, dated Oct. 15, 2021.

File History of U.S. Appl. No. 11/863,149, now U.S. Pat. No. 7,935,082, as of May 3, 2011, filed Sep. 27, 2007. First Named Inventor, Keshava Datta. Title, Control Handle with Device Advancing Mechanism.

File History of U.S. Appl. No. 13/085,351, now U.S. Pat. No. 8,562,568, as of Oct. 22, 2013, filed Apr. 12, 2011. First Named Inventor, Keshava Datta. Title, Control Handle with Device Advancing Mechanism.

Spectranetics, "TightRail & TightRail Mini, Rotating Dilator Sheaths", Brochure, 2014.

File History of U.S. Appl. No. 14/060,517, now U.S. Pat. No. 9,220,531, as of Dec. 29, 2015, filed Oct. 22, 2013. First Named Inventor, Keshava Datta. Title, Control Handle with Device Advancing Mechanism.

File History of U.S. Appl. No. 14/981,393, now U.S. Pat. No. 9,545,500, as of Jan. 17, 2017, filed Dec. 28, 2015. First Named Inventor, Keshava Datta. Title, Control Handle with Device Advancing Mechanism.

Spectranetics, "TightRail SUB-C, Rotating Dilator Sheath", Brochure, 2017.

File History of U.S. Appl. No. 15/408,361, now U.S. Pat. No. 10,238,838, as of Mar. 26, 2019, filed Jan. 17, 2017. First Inventor, Keshava Datta. Title, Control Handle with Device Advancing Mechanism.

File History of U.S. Appl. No. 16/363,954, filed Mar. 25, 2019. First Named Inventor, Keshava Datta. Title, Control Handle with Device Advancing Mechanism.

European Extended Search Report, Application No. 22187835.8, dated Nov. 29, 2022.

"Olympus", KeyMed, Naso-Laryngoscopes, Laryngoscopes, Brochure, 2011.

"Synmed, Trans-Nasal, Sidposavle System for Upper GI Screening", E.G. Scan, Brochure, 2013.

Kezirian, "A World Leader in Surgery for Snoring and Sleep Apnea—Drug-Induced Sleep Endoscopy", Blog, https://sleem-doctor.com/surgical-treatment-overview/drig-induced-sleep-endoscopy/., 3 pgs, Accessed Jun. 19, 2014.

Wolf, "CCD Endoscopes Brochure", http://www.richard-wolf.com/en/human-medicine/visulaisation/video-endoscopes/ccd-endoscopes.html (printed Jun. 9, 2014), 1-8.

Wolf, "Visualization to the Max", EyeMax brochure, (date unavailable).

European Search Report dated Aug. 20, 2025 for EP25165430.7.

* cited by examiner

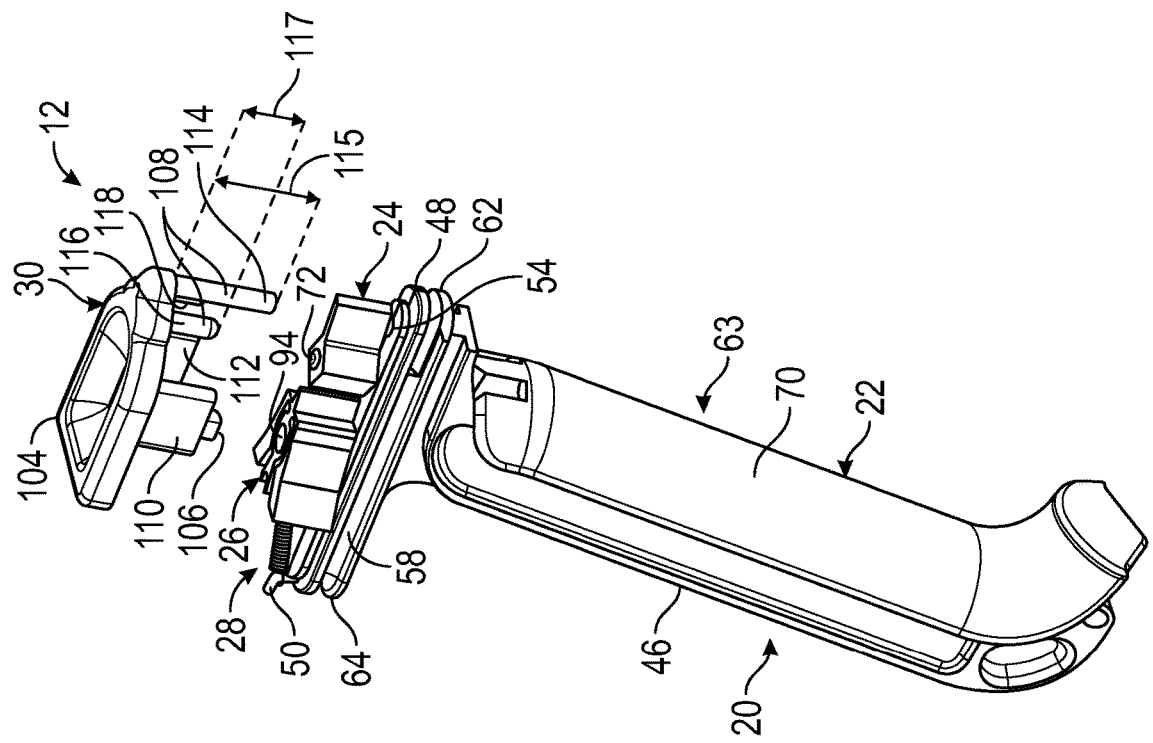
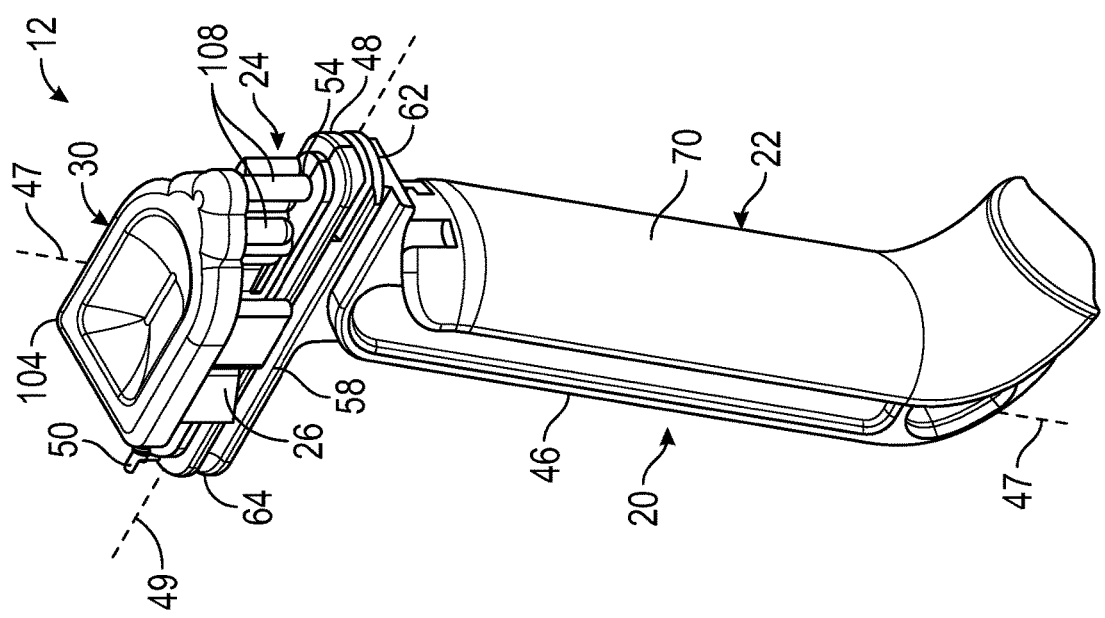

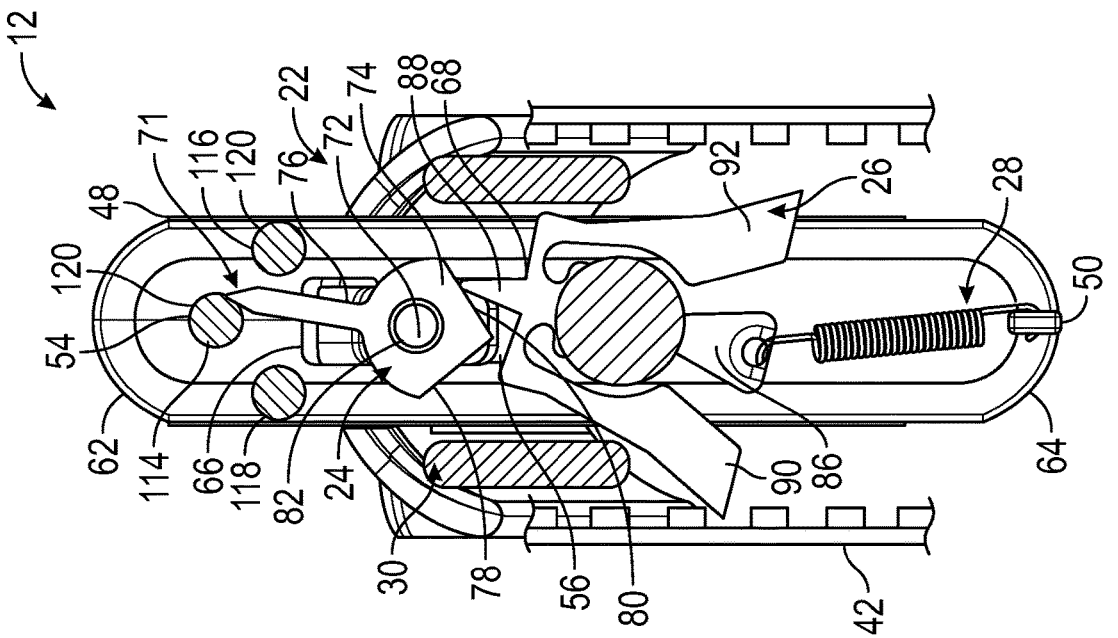
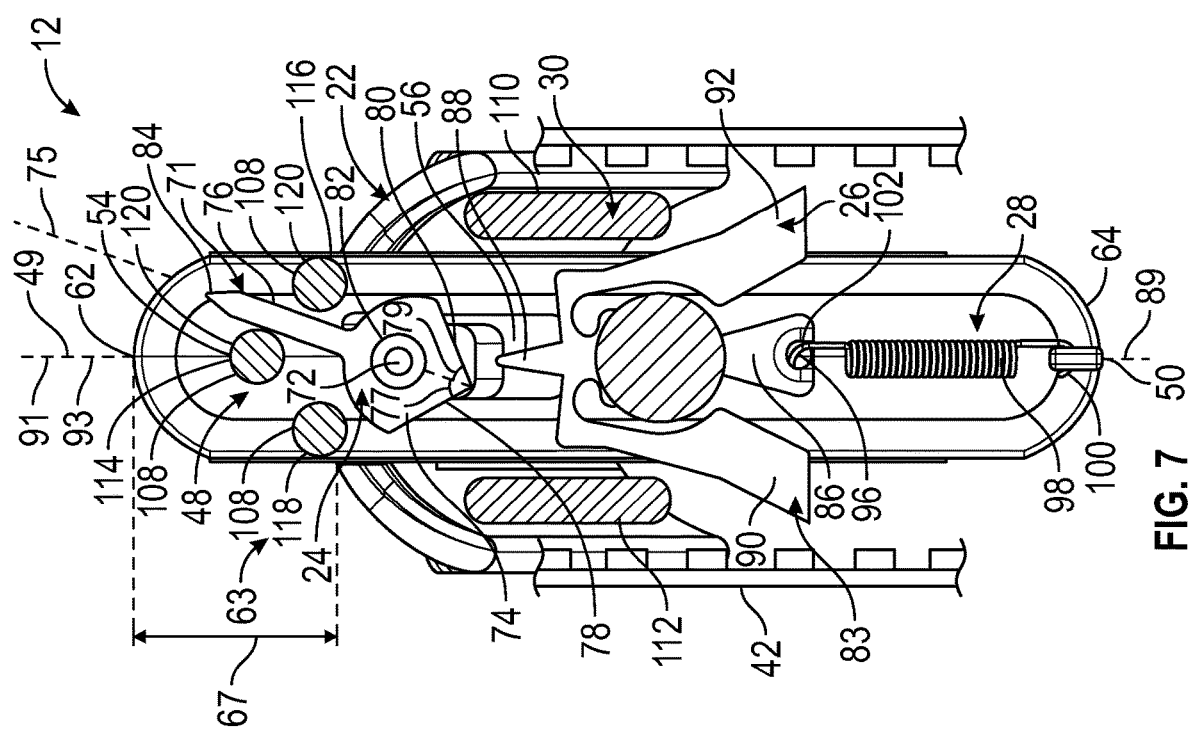

MEDICAL DEVICES THAT INCLUDE A TRIGGER ASSEMBLY FOR A ROTATABLE CATHETER AND METHODS OF USE

RELATED APPLICATION

This application claims priority to U.S. Provisional Application No. 63/227,008, filed Jul. 29, 2021. The entire contents of this related application are hereby incorporated by reference into this disclosure.

FIELD

The disclosure relates generally to the field of medical devices and methods of using a medical device. More particularly, the disclosure relates to medical devices that include a trigger assembly for a rotatable catheter and methods of using a medical device that includes a trigger assembly for a rotatable catheter.

BACKGROUND

Medical devices such as implanted cardiac pacing systems, such as pacemakers and defibrillators, generally employ an implanted power source (e.g., pulse generator) and one more leads. The leads are attached to the pulse generator and the heart and include electrodes in direct contact with heart tissue to convey electrical stimulation of the heart muscle. Proper placement of the leads in the body is necessary to assure delivery of the electrical stimuli and accomplish electrical stimulation of the heart muscle. As a result, the leads are disposed within various portions of the body. For example, a lead can be positioned within an artery, a vein, or a chamber of the heart.

Subsequent to implantation, the body may react to the implanted cardiac pacing system by forming scar tissue along a lead and its associated electrode. While leads are generally designed to be implanted permanently, there are instances in which it may be necessary to remove and/or replace a lead, such as when the patient develops an infection or the pacemaker or cardiac defibrillator has malfunctioned. The presence of any scar tissue, lesions, calcification, and/or plaque buildup around the lead and its associated electrode increases the difficultly associated with removing the lead.

Various lead removal devices have been developed to increase the efficiency of extracting an implanted lead. For example, some lead removal devices include a catheter and a dissecting tip disposed on the distal end of the catheter. The catheter is advanced over the lead and the dissecting tip assists with separating any lesions and calcifications from the lead such that it can be removed. However, these devices have drawbacks. For example, some lead extraction devices include drive mechanisms that have a minimal surface area that contacts the structure utilized to move a drive assembly between its first and second positions and/or include drive mechanisms that prevent a drive assembly from consistently alternating between a clockwise and a counterclockwise direction during use. These drawbacks increase the time required to complete a lead extraction procedure and the hand fatigue experienced by a user during completion of a procedure.

A need exists, therefore, for new and useful medical devices that include a trigger assembly for a rotatable catheter and methods of using a medical device that includes a trigger assembly for a rotatable catheter.

SUMMARY OF SELECTED EXAMPLE EMBODIMENTS

Various example medical devices that include a trigger assembly for a rotatable catheter and methods of using a medical device that includes a trigger assembly for a rotatable catheter are described herein.

An example medical device that includes a trigger assembly for a rotatable catheter includes a housing, a catheter, a drive assembly, and a trigger assembly. The housing defines a chamber and a passageway in communication with the chamber. The catheter is partially disposed through the passageway and is rotatable relative to the housing. The drive assembly is disposed within the chamber and is moveable relative to the housing. Movement of the drive assembly results in rotation of the catheter. The trigger assembly is partially disposed within the chamber and includes a trigger, a drive initiator, a drive member, a flip drive, and a biasing member. The trigger is attached to the housing and is moveable between a first position and a second position relative to the housing. The drive initiator is attached to the trigger and is moveable between a first position and a second position relative to the trigger. The drive member is attached the drive initiator and is moveable relative to the trigger between a first position and a second position. The flip drive is attached to the trigger and is moveable between a neutral position, a first drive position, and a second drive position. The flip drive is in the neutral position when the drive initiator is in the first position. The flip drive is in the first drive position when the drive initiator is in the second position and the drive member is in the second position. The flip drive is in the second drive position when the drive initiator is in the second position and the drive member is in the first position. The biasing member is disposed within the chamber and biases the flip drive to the neutral position when the drive initiator is in the first position. The drive assembly moves relative to the housing when the flip drive is in the first drive position and the trigger is moved from its first position to its second position. The drive assembly moves relative to the housing when the flip drive is in the second drive position and the trigger is moved from its first position to its second position.

Another example medical device that includes a trigger assembly for a rotatable catheter includes a housing, a catheter, a drive assembly, and a trigger assembly. The housing defines a chamber and a passageway in communication with the chamber. The catheter is partially disposed through the passageway and is rotatable relative to the housing. The drive assembly is disposed within the chamber and is moveable relative to the housing. Movement of the drive assembly results in rotation of the catheter. The trigger assembly is partially disposed within the chamber and includes a trigger, a drive initiator, a drive member, a flip drive, and an extension spring. The trigger is attached to the housing and is moveable between a first position and a second position relative to the housing. The drive initiator is attached to the trigger and is moveable between a first position and a second position relative to the trigger. The drive member is attached the drive initiator and is moveable relative to the trigger between a first position and a second position. The flip drive is attached to the trigger and is moveable between a neutral position, a first drive position, and a second drive position. The flip drive is in the neutral position when the drive initiator is in the first position. The flip drive is in the first drive position when the drive initiator is in the second position and the drive member is in the second position. The flip drive is in the second drive position when the drive initiator is in the second position and the drive member is in the first position. The flip drive has a central portion, a first driver arm, and a second driver arm. Each of the first driver arm and the second driver arm is moveably attached to the central portion. Each of the first driver arm and second driver arm is attached to the central portion using a living hinge. The extension spring is attached to the flip drive and the trigger and biases the flip drive to the neutral position when the drive initiator is in the first position. The drive assembly moves relative to the housing when the flip drive is in the first drive position and the trigger is moved from its first position to its second position. The drive assembly moves relative to the housing when the flip drive is in the second drive position and the trigger is moved from its first position to its second position.

An example method of using a first medical device that includes a trigger assembly for a rotatable catheter to remove a second medical device attached to a portion of a body of an animal where the medical device is disposed within a bodily passage of the body includes: obtaining a first medical device that has a housing, a catheter, a drive assembly, and a trigger assembly, the trigger assembly includes a trigger, a drive initiator, a drive member, a flip drive, a biasing member, and a retaining cap, the drive member is in a first position; introducing a portion of a second medical device disposed within a bodily passage of a body of an animal into a lumen defined by the catheter; applying a proximally-directed force on the second medical device while maintaining the position of the first medical device until the second medical device is disposed proximal to the catheter; applying a distally-directed force on the first medical device while applying proximally-directed force on the second medical device such that the first medical device is introduced into the bodily passage; continuing the application of a distally-directed force on the first medical device while applying proximally-directed force on the second medical device such that the first medical device is advanced into the bodily passage; applying a proximally-directed force on the drive initiator and the trigger while maintaining the position of the grip such that the drive member moves to a second position, the flip drive contacts a portion of the drive assembly, and the catheter rotates and dissects tissue from the second medical device; stopping the application of a proximally-directed force on the trigger; applying a distally-directed force on the first medical device while applying a proximally-directed force on the second medical device such that the first medical device is advanced into the bodily passage; applying a proximally-directed force on the second medical device while maintaining the position of the first medical device until the second medical device is withdrawn from the bodily passage; applying a proximally-directed force on the first medical device until the first medical device (e.g., catheter r) is withdrawn from the bodily passage.

Additional understanding of these example medical devices that include a trigger assembly for a rotatable catheter and methods of using a medical device that includes a trigger assembly for a rotatable catheter can be obtained by review of the detailed description, below, and the appended drawings.

BRIEF DESCRIPTION OF THE DRAWINGS

FIG. 5 is a perspective view of the trigger assembly of the medical device illustrated in FIG. 1.

FIG. 6 is a partially exploded perspective view of the trigger assembly illustrated in FIG. 5.

FIG. 7 is a partial sectional view of the medical device illustrated in FIG. 1. The trigger is in the first position, the drive initiator is in the first position, the drive member is in the first position, the flip drive is in the neutral position, and the drive assembly is static relative to the housing.

FIG. 8 is a partial sectional view of the medical device illustrated in FIG. 1. The trigger is in the first position, the drive initiator is between the first position and the second position, the drive member is in the first position, the flip drive is between the neutral position and the first drive position, and the drive assembly is static relative to the housing.

DETAILED DESCRIPTION OF SELECTED EXAMPLES

Figure 1:
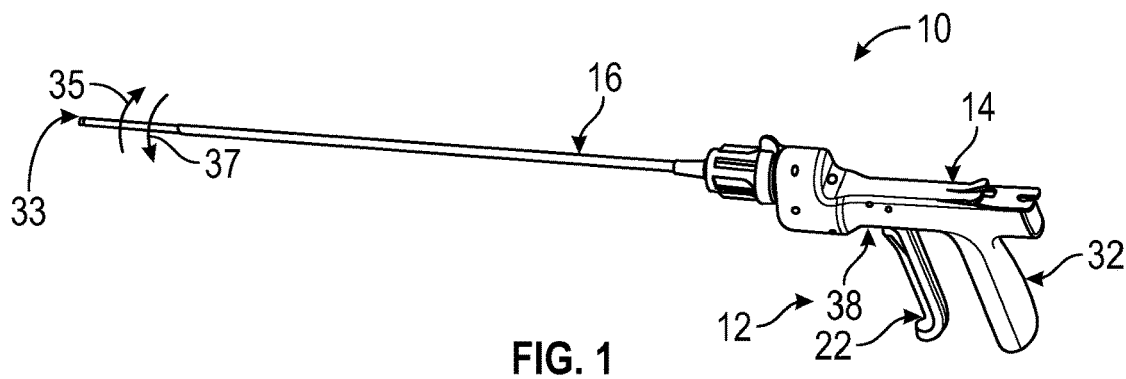
FIG. 1 is a perspective view of an example medical device that includes a trigger assembly for a rotatable catheter.

The following detailed description and the appended drawings describe and illustrate various example embodiments of medical devices that include a trigger assembly for a rotatable catheter and methods of using a medical device that includes a trigger assembly for a rotatable catheter. The description and illustration of these examples are provided to enable one skilled in the art to make and use a medical device that includes a trigger assembly for a rotatable catheter and practice a method of using a medical device that includes a trigger assembly for a rotatable catheter. They are not intended to limit the scope of the claims in any manner. The invention is capable of being practiced or carried out in various ways and the examples described and illustrated herein are merely selected examples of the various ways of practicing or carrying out the invention and are not considered exhaustive.

FIGS. 1, 2, 3, 4, 5, 6, 7, 8, 9, 10, 11, 12, 13, 14, and 15 illustrate an example medical device 10 that includes a trigger assembly 12. The medical device 10 is a transvenous lead extraction device useful for removing implanted cardiac pacing leads in a minimally invasive procedure. The medical device 10 has a housing 14, a catheter 16, a drive assembly 18, and the trigger assembly 12 is partially disposed within the housing 14. In the illustrated embodiment, the trigger assembly 12 includes a trigger 20, a drive initiator 22, a drive member 24, a flip drive 26, a biasing member 28, and a retaining cap 30.

In the illustrated embodiment, the housing 14 defines a grip 32, a chamber 34, a passageway 36, and a slot 38. Each of the passageway 36 and the slot 38 is in communication with the chamber 34. The catheter 16 is partially disposed through the passageway 36 defined by the housing 14, is partially disposed within the chamber 34 defined by the housing 14, defines a lumen 33, and is rotatable relative to the housing 14 in a first direction 35 (e.g., clockwise) and a second direction 37 (e.g., counterclockwise). The drive assembly 18 is disposed within the chamber 34 and is moveable relative to the housing 14 such that movement of the drive assembly 18 results in rotation of the catheter 16. In the embodiment illustrated, the drive assembly 18 is moveable relative to the housing 14 in a first direction 39 and a second direction 41 such that movement of the drive assembly 18 in the first direction 39 results in rotation of the catheter 16 in the first direction 35 and movement of the drive assembly 18 in the second direction 41 results in rotation of the catheter 16 in the second direction 37. In the illustrated embodiment, the drive assembly 18 contacts the housing 14 and the catheter 16 and includes a gear assembly 40 and a drive belt 42. While a particular drive assembly 18 that includes a gear assembly 40 and a drive belt 42 has been illustrated, any suitable drive assembly can be included in a medical device.

Figure 2:
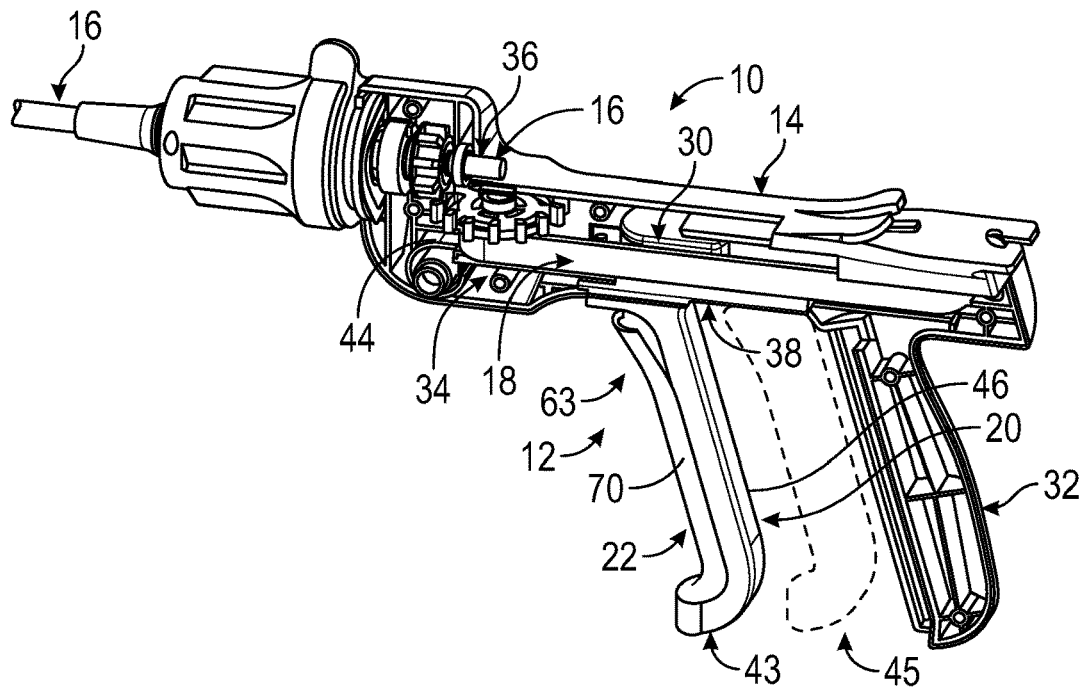
FIG. 2 is a partially broken away partial perspective view of the medical device illustrated in FIG. 1.
Figure 3:
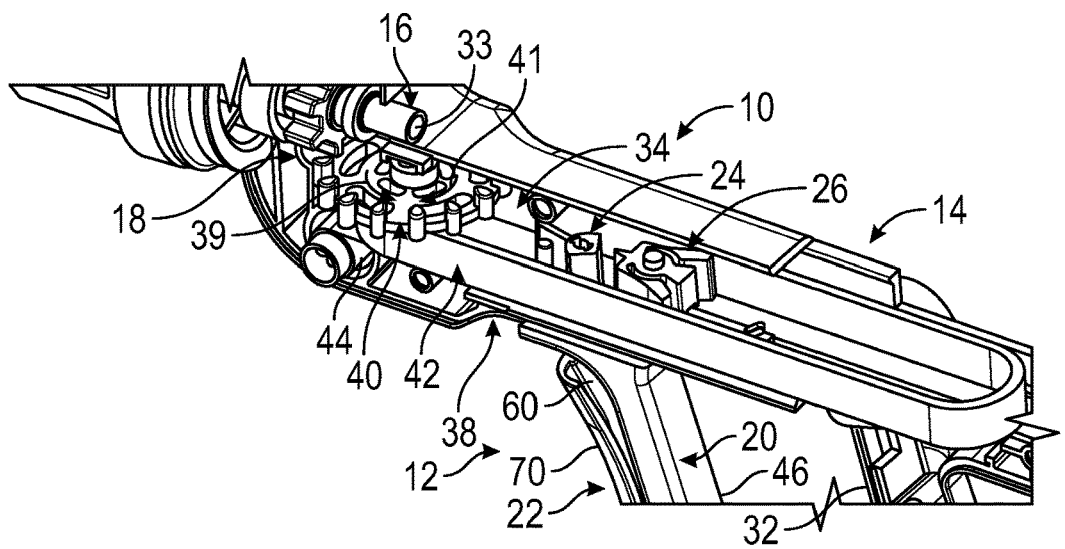
FIG. 3 is another partially broken away partial perspective view of the medical device illustrated in FIG. 1.
Figure 4:
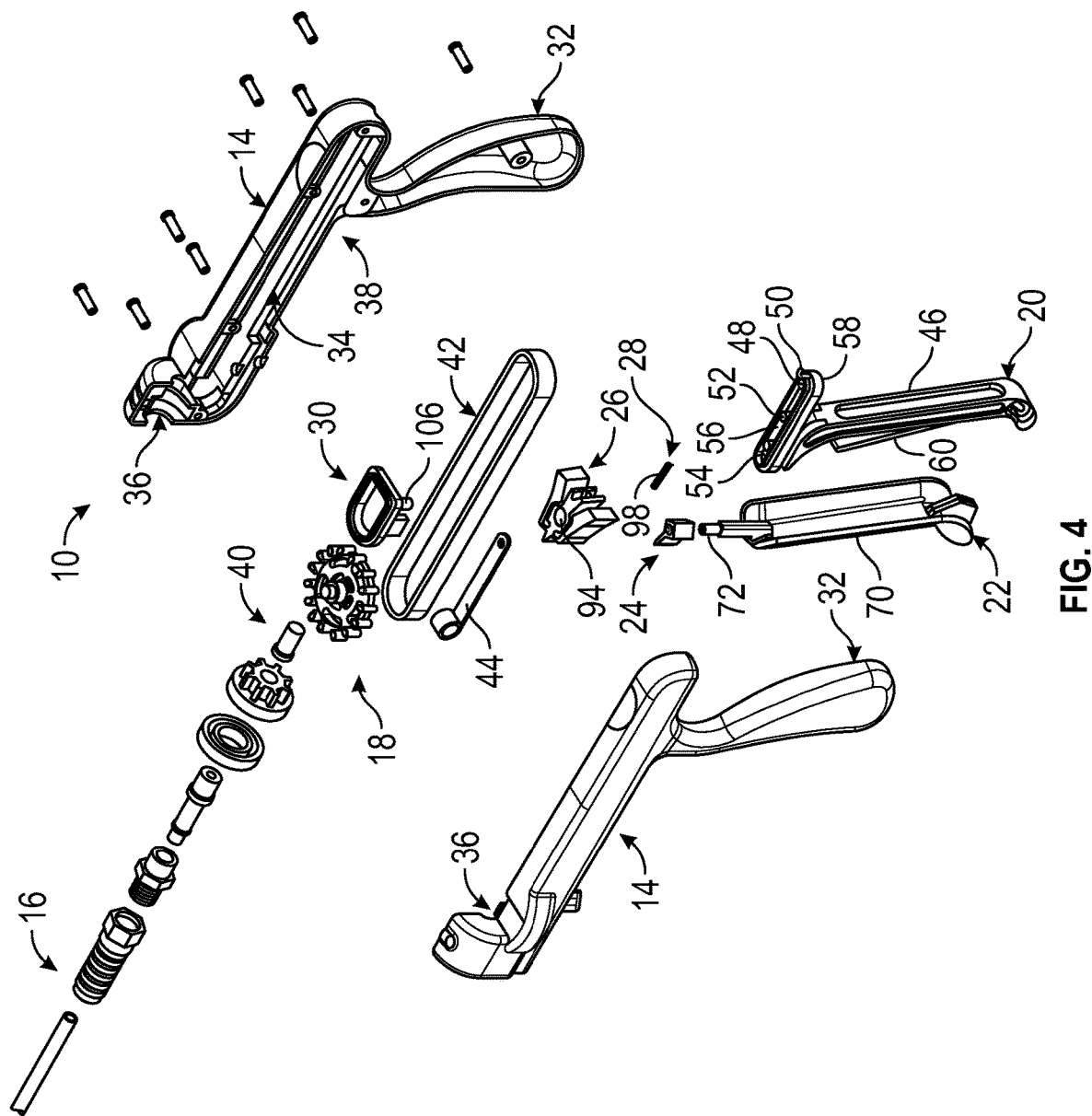
FIG. 4 is a partial exploded view of the medical device illustrated in FIG. 1.

The trigger assembly 12 is partially disposed within the chamber 34 defined by the housing 14. The trigger 20 is moveably attached to the housing 14 and is moveable between a first position 43 and a second position 45 relative to the housing 14, as shown in FIG. 2, upon the application, and removal, of an axial force on the trigger 20 directed toward the grip 32. The trigger 20 is disposed through the slot 38 defined by the housing 14, is partially disposed within the chamber 34 defined by the housing 14, and is biased to the first position 43 using a coil member 44 that is attached to trigger 20 and the housing 14. The trigger 20 has a lengthwise axis 47, a handle 46, a base 48, a projection 50, and defines a first recess 52, a second recess 54, a slot 56, and a track 58. The handle 46 extends from the base 48 and away from the housing 14, is disposed outside the chamber 34 defined by the housing 14, and is sized to be received by the hand of a user. The handle 46 includes a biasing member 60 that extends from the handle 46 toward the drive initiator 22 and biases the drive initiator 22 in the first position, as described in more detail herein. Alternative embodiments, however, can include a spring, or other component, between a handle and a drive initiator to bias the drive initiator in the first position. The base 48 is disposed within the chamber 34 defined by the housing 14, has a lengthwise axis 49, a first end 62, a second end 64, and receives the drive initiator 22, the drive member 24, the flip drive 26, the biasing member 28, and the retaining cap 30, as described herein. The projection 50 extends from the base 48 and away from the first end 62 of the base 48. Each of the first recess 52 and the second recess 54 extends into the base 48 and is sized to receive a portion of the retaining cap 30. The first recess 52 is disposed between the second end 64 and the slot 56. The second recess 54 is disposed between the slot 56 and the first end 62 of the base 48. The slot 56 is disposed between the first recess 52 and the second recess 54, has a first end 66 and a second end 68, and is sized to receive a portion of the drive initiator 22. The track 58 extends around the base 48 and mates with a portion of the housing 14 to maintain the position of the trigger 20 relative to the housing 14 along the lengthwise axis 47 of the trigger 20 and allow the trigger 20 to move relative to the housing 14 along the lengthwise axis 49 of the base 48 and within the slot 38 defined by the housing 14.

Figure 10:
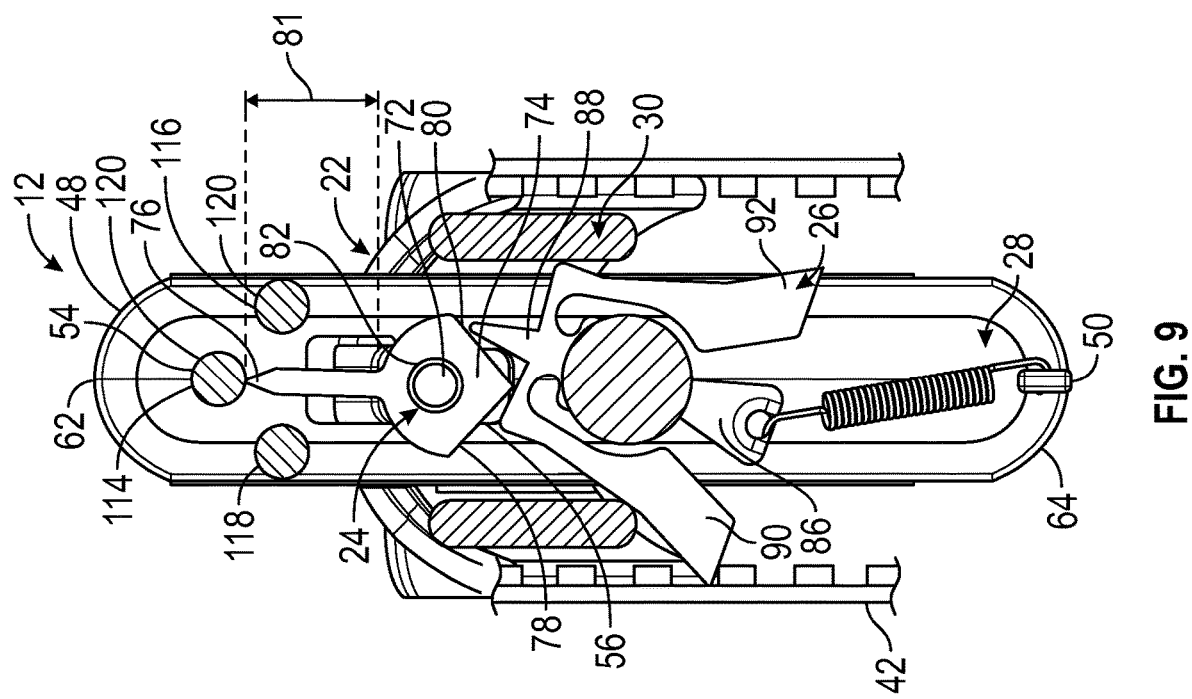
FIG. 10 is a partial sectional view of the medical device illustrated in FIG. 1. The trigger is between in the first position and the second position, the drive initiator is in the second position, the drive member is in the second position, the flip drive is in the first drive position, and the drive assembly is moving relative to the housing.

The drive initiator 22 is moveably attached to the trigger 20 and is moveable between a first position 63 and a second position 65 relative to the trigger 20, as shown in FIGS. 7 and 10. In the illustrated embodiment, the drive initiator 22 is partially disposed through the slot 56 defined by the trigger 20 and has a main body 70 and a post 72. The main body 70 is disposed adjacent to the handle 46 of the trigger 20. The post 72 extends from the main body 70, through the slot 56 defined by the trigger 20, and is disposed within the chamber 34 defined by the housing 14. As shown in FIG. 7, the drive initiator 22 is disposed a first distance 67 from the first end 62 of the base 48 of the trigger 20 when in the first position 63. As shown in FIG. 10, the drive initiator 22 is disposed a second distance 69 from the first end 62 of the base 48 of the trigger 20 when in the second position 65. The second distance 69 is greater than the first distance 67.

Figure 9:
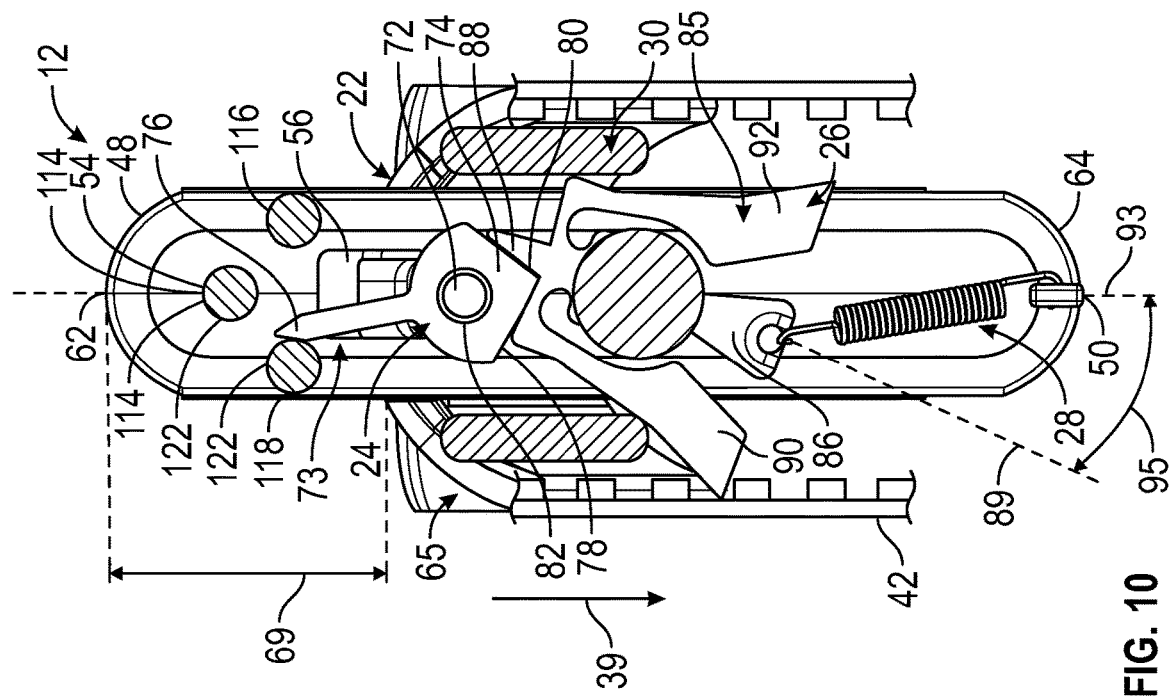
FIG. 9 is a partial sectional view of the medical device illustrated in FIG. 1. The trigger is in the first position, the drive initiator is between the first position and the second position, the drive member is between the first position and the second position, the flip drive is between the neutral position and the first drive position, and the drive assembly is static relative to the housing.
Figure 11:
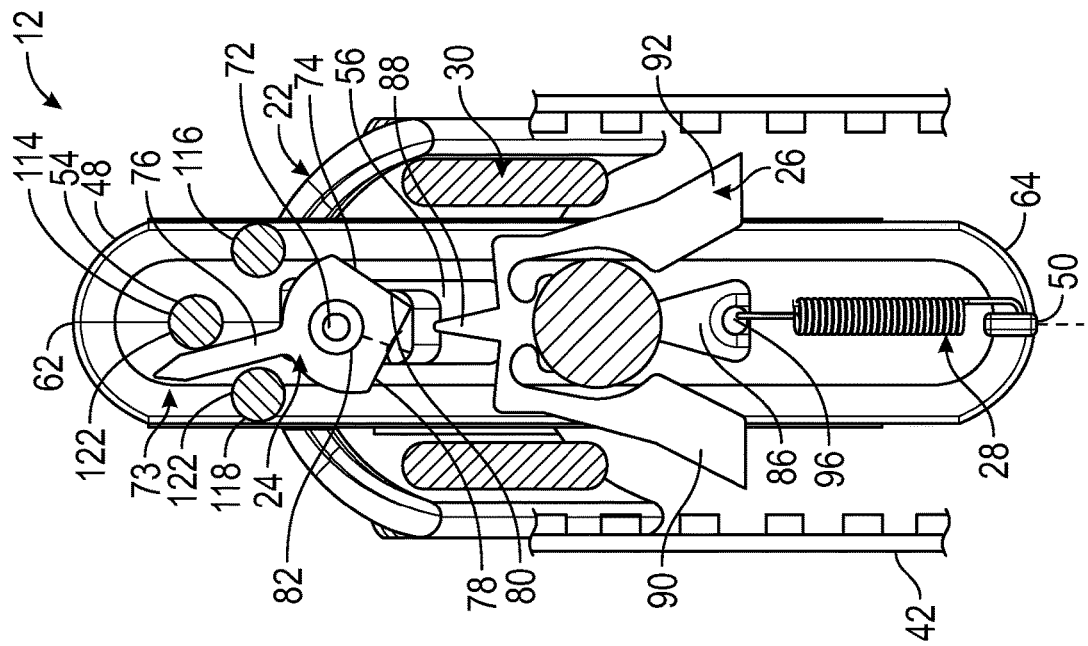
FIG. 11 is a partial sectional view of the medical device illustrated in FIG. 1. The trigger is between in the first position and the second position, the drive initiator is between the first position and the second position, the drive member is in the second position, the flip drive is between the first drive position and the neutral position, and the drive assembly is static relative to the housing.
Figure 12:
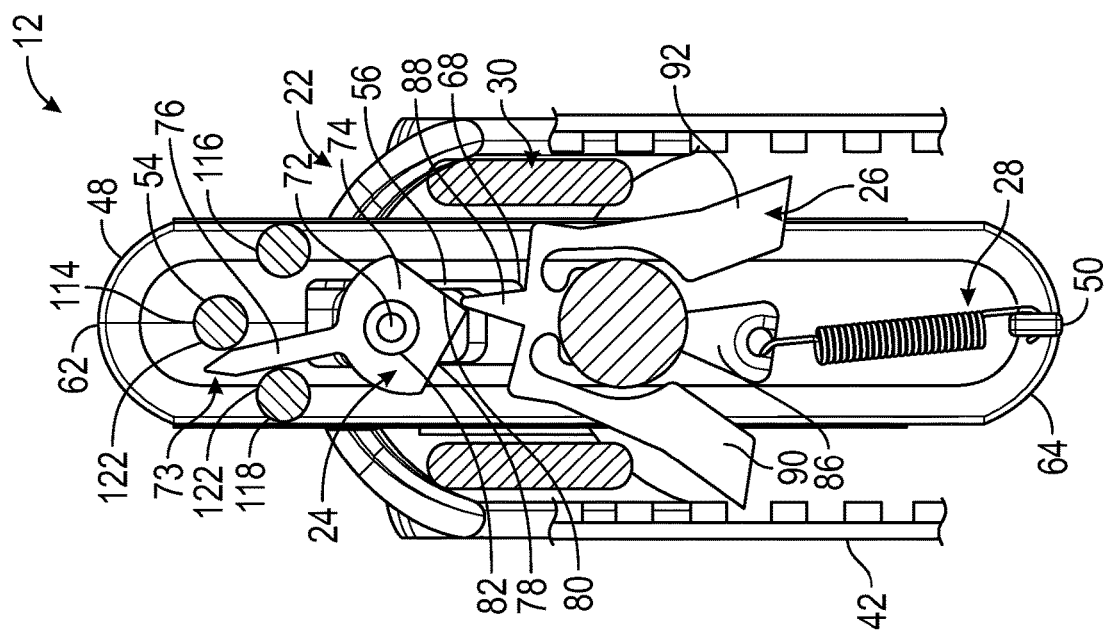
FIG. 12 is a partial sectional view of the medical device illustrated in FIG. 1. The trigger is in the first position, the drive initiator is in the first position, the drive member is in the second position, the flip drive is in the neutral position, and the drive assembly is static relative to the housing.

The drive member 24 is moveably attached the drive initiator 22 and is moveable relative to the trigger 20 and the flip drive 26 between a first position 71, as shown in FIGS. 7, 8, 14, and 15, and a second position 73, as shown in FIGS. 10, 11, and 12. In the first position 71, and when the drive initiator 22 is in the first position 63, a portion of the drive member 24 is disposed between a first set of guide pegs 120 of the retaining cap 30, as described in more detail herein. In the second position 73, and when the drive initiator 22 is in the first position 63, the portion of the drive member 24 is disposed between a second set of guide pegs 122 of the retaining cap 30, as described herein. In the illustrated embodiment, the drive member 24 has a lengthwise axis 75, a nose 74, and a tail 76. The nose 74 has a first surface 78, a second surface 80, and defines a passageway 82 within which the post 72 of the drive initiator 22 is disposed. The drive member 24 is moveable on the post 72 between the first and second positions. The lengthwise axis 75 extends through the tail 76 and the passageway 82. As shown in FIG. 7, the first surface 78 is disposed at a first angle 77 relative to the lengthwise axis 75 of the drive member 24. The second surface 80 is disposed at a second angle 79 relative to the lengthwise axis 75 of the drive member 24. Each of the first and second surfaces 78, 80 is adapted to contact a portion of the flip drive 26 to move the flip drive 26 between its first drive position 85 and its second drive position 87, as described in more detail herein. The tail 76 extends from the nose 74 and has a tapered end 84 and a length 81, as shown in FIG. 9 that extends from the tapered end 84 to the nose 74. The length 81 of the tail 76 is less than the distance between the first guide peg 114 of the retaining cap 30 and the second end 68 of the slot 56 of the trigger 20.

Figure 14:
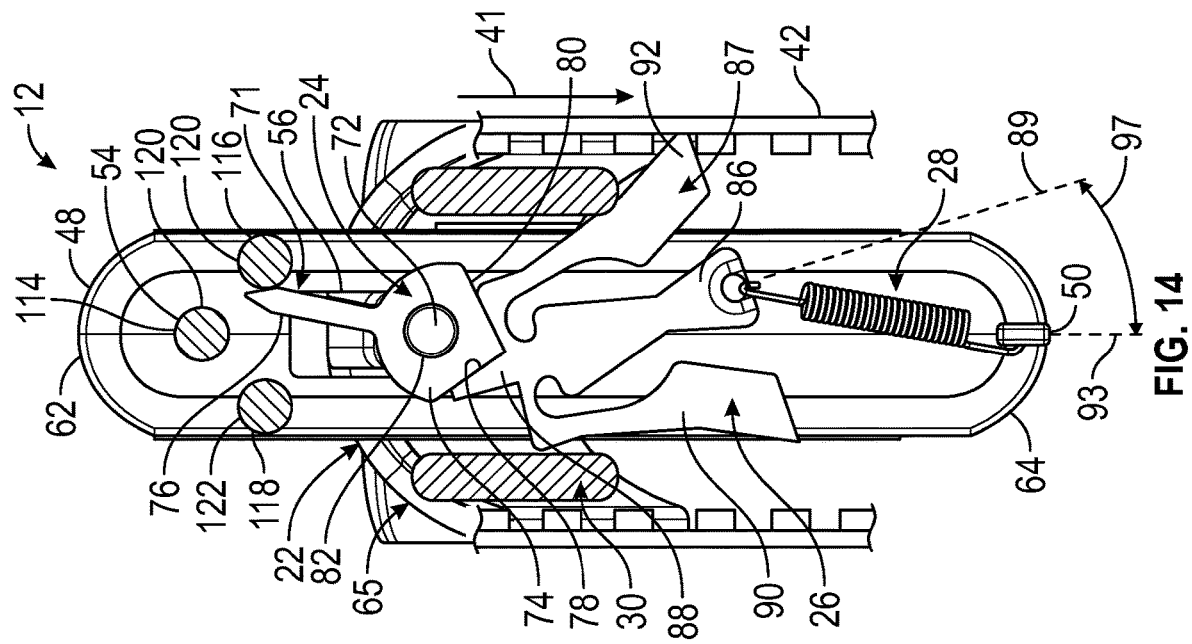
FIG. 14 is a partial sectional view of the medical device illustrated in FIG. 1. The trigger is between in the first position and the second position, the drive initiator is in the second position, the drive member is in the first position, the flip drive is in the second drive position, and the drive assembly is moving relative to the housing.

The flip drive 26 is moveably attached to the trigger 20 and is moveable between a neutral position 83, a first drive position 85, and a second drive position 87. The flip drive 26 is in the neutral position when the trigger 20 is in the first position 43 and the drive initiator 22 is in the first position 63. The flip drive 26 is in the first drive position 85 when the drive initiator 22 is in the second position 65 and the drive member 24 is in the second position 73. The flip drive 26 is in the second drive position 87 when the drive initiator 22 is in the second position 65 and the drive member 24 is in the first position 71. The flip drive 26 has a lengthwise axis 89, a central portion 86, a projection 88, a first driver arm 90, and a second driver arm 92. The central portion 86 defines a first passageway 94, as shown in FIG. 6, through which the projection 106 of the retaining cap 30 is disposed and a second passageway 96 through which a portion of the biasing member 28 is disposed. The projection 88 extends from the central portion 86, toward the drive member 24, and, depending on the position of the drive member 24, is adapted to contact either the first surface 78 or the second surface 80 of the drive member 24. Each of the first and second driver arms 90, 92 is moveably attached to the central portion 86 using a living hinge. The lengthwise axis 89 of the flip drive 26 is disposed at a first angle 91 relative to a plane 93 that contains the lengthwise axis 47 of the trigger 20 and the lengthwise axis 49 of the base 48 when in the neutral position 83, as shown in FIG. 7, is disposed at a second angle 95 relative to the plane 93 that contains the lengthwise axis 47 of the trigger 20 and the lengthwise axis 49 of the base 48 when in the first drive position 85, as shown in FIG. 10, and is disposed at a third angle 97 relative to the plane 93 that contains the lengthwise axis 47 of the trigger 20 and the lengthwise axis 49 of the base 48 when in the second drive position 87, as shown in FIG. 14. The first angle 91 is equal to about 0 degrees such that the lengthwise axis 89 of the flip drive 26 is disposed on the plane 93 that contains the lengthwise axis 47 of the trigger 20 and the lengthwise axis 49 of the base 48. The second angle 95 is between about 0 degrees and about 90 degrees. The third angle 97 is between about 0 degrees and about 90 degrees. While particular angles have been described, a first angle, a second angle, and a third angle can be any suitable angle. In the illustrated embodiment, the flip drive 26 is formed as a single, continuous piece of material. However, in alternative embodiments, a flip drive can be formed of multiple pieces of material attached to one another.

The biasing member 28 is disposed within the chamber 34 of the housing 14. The biasing member 28 is attached to the trigger 20 and the flip drive 26 and biases the flip drive 26 to the neutral position 83 when the drive initiator 22 is in the first position 63. In the illustrated embodiment, the biasing member 28 is an extension spring 98 that has a first end 100 attached to the projection 50 of the trigger 20 and a second end 102 that is partially disposed within the second passageway 96 of the flip drive 24 such that the biasing member 28 is attached to the flip drive 26. While an extension spring 98 has been illustrated, a biasing member 28 can comprise any suitable component capable of biasing a flip drive to its neutral position while allowing the flip drive to move between the neutral position, the first drive position, and the second drive position, as described herein.

The retaining cap 30 is attached to the trigger 20 and has a main body 104, a projection 106, a plurality of guide pegs 108, a first drive belt track 110, and a second drive belt track 112. The projection 106 extends from the main body 104 toward the trigger 20, through the first passageway 94 of the central portion 86 of the flip drive 26, and into the first recess 52 of the trigger 20. Each peg of the plurality of guide pegs 108 extends from the main body 104 and toward the trigger 20. The plurality of guide pegs 108 includes a first guide peg 114, a second guide peg 116, and a third guide peg 118. As shown in FIG. 6, the first guide peg 114 has a first length 115 and each of the second and third guide pegs 116, 118 has a second length 117 that is less than the first length 115. The first guide peg 114 is disposed within the second recess 54 of the trigger 20. The first and second drive belt tracks 110, 112 provide a mechanism for maintaining the position of the drive belt 42 during use. The drive member 24 (e.g., tail 76) is partially disposed between a first set of guide pegs 120 of the plurality of guide pegs 108 when the drive member 24 is in the first position 71. The drive member 24 (e.g., tail 76) is partially disposed between a second set of guide pegs 122 of the plurality of guide pegs 108 when the drive member 24 is in the second position 73. The first set of guide pegs 120 includes the first guide peg 114 and the second guide peg 116. The second set of guide pegs 122 includes the first guide peg 114 and the third guide peg 118. Thus, the second set of guide pegs 122 is different than the first set of guide pegs 120. Alternative embodiments can omit the inclusion of a retaining cap and include a projection, a plurality of guide pegs, a first drive belt track, and/or a second drive belt track on a trigger.

In use, the drive assembly 18 moves relative to the housing 14 when the flip drive 26 is in the first drive position 85 and the trigger 20 is moved from its first position 43 to its second position 45. The drive assembly 18 moves relative to the housing 14 when the flip drive 26 is in the second drive position 87 and the trigger 20 is moved from its first position 43 to its second position 45. The drive assembly 18 moves relative to the housing 14 in the first direction 39 when the flip drive 26 is in the first drive position 85 and the trigger 20 is moved from its first position 43 to its second position 45. The drive assembly 18 moves relative to the housing 14 in the second direction 41 when the flip drive 26 is in the second drive position 87 and the trigger 20 is moved from its first position 43 to its second position 45.

FIGS. 7 through 15 illustrate the example medical device 10 during use. FIG. 7 illustrates the trigger 20 in the first position 43, the drive initiator 22 in the first position 63, the drive member 24 in the first position 71, the flip drive 26 in the neutral position 83, and the drive assembly 18 static relative to the housing 14. Upon the application of a force on the drive initiator 22 directed toward the grip 32 while maintaining the position of the housing 12, the drive initiator 22 moves from its first position 63 toward its second position 65, the drive member 24 advances toward the flip drive 26, and the drive member 24 contacts the flip drive 26 and positions the flip drive 26 between the neutral position 83 and the first drive position 85. In the illustrated embodiment, the second surface 80 of the drive member 24 contacts the projection 88 of the flip drive 26. FIG. 8 illustrates the trigger 20 in the first position 43, the drive initiator 22 between the first position 63 and the second position 65, the drive member 24 in the first position 71, the flip drive 26 between the neutral position 83 and the first drive position 85, and the drive assembly 18 static relative to the housing 14.

By continuing the application of a force on the drive initiator 22 directed toward the grip 32 while maintaining the position of the housing 12, the drive initiator 22 continues to advance toward its second position 65, the drive member 24 advances toward the flip drive 26, and the drive member 24 contacts the flip drive 26 and positions the flip drive 26 between the neutral position 83 and the first drive position 85. In the illustrated embodiment, the second surface 80 of the drive member 24 contacts the projection 88 of the flip drive 26, the drive member 24 contacts the first driver arm 90 of the flip drive 26, and the first driver arm 90 of the flip drive 26 contacts the drive belt 42 of the drive assembly 18. FIG. 9 illustrates the trigger 20 in the first position 43, the drive initiator 22 between the first position 63 and the second position 65, the drive member 24 between the first position 71 and the second position 73, the flip drive 26 between the neutral position 83 and the first drive position 85 and contacting the drive assembly 18 (e.g., drive belt 42), and the drive assembly 18 static relative to the housing 14.

By continuing the application of a force on the drive initiator 22 directed toward the grip 32 and applying a force on the trigger 20 directed toward the grip 32 while maintaining the position of the housing 12, the drive initiator 22 advances to its second position 65, the drive member 24 advances toward the flip drive 26, and the drive member 24 contacts the flip drive 26 and positions the flip drive 26 in the first drive position 85. In the illustrated embodiment, the second surface 80 of the drive member 24 contacts the projection 88 of the flip drive 26, the first surface 78 of the drive member 24 contacts the first driver arm 90 of the flip drive 26, and the first driver arm 90 of the flip drive 26 contacts the drive belt 42 of the drive assembly 18. The structural configuration of the flip drive 26 provides a mechanism for moving the drive member 24 between its first and second positions during use. FIG. 10 illustrates the trigger 20 between the first position 43 and the second position 45, the drive initiator 22 in the second position 65, the drive member 24 in the second position 73, the flip drive 26 in the first drive position 85 and contacting the drive assembly 18 (e.g., drive belt 42), and the drive assembly 18 moving relative to the housing 14 in a first direction 39.

The drive assembly 18 continues to move relative to the housing 14 in the first direction 39 as the trigger 20 is advanced to its second position 45. By releasing the application of a force on the drive initiator 22 and the trigger 20, the trigger 20 advances toward the first position 43 due to the bias of the coil member 44, the drive initiator 22 advances toward its first position 63, the drive member 24 advances away from the flip drive 26, and the drive member 24 positions the flip drive 26 between the neutral position 83 and the first drive position 85. In the illustrated embodiment, the second surface 80 of the drive member 24 contacts the projection 88 of the flip drive 26. FIG. 11 illustrates the trigger 20 between the first position 43 and the second position 45, the drive initiator 22 between the first position 63 and the second position 65, the drive member 24 in the second position 73, the flip drive 26 between the neutral position 83 and the first drive position 85, and the drive assembly 18 static relative to the housing 14. If it is desired to continue to move the drive assembly 19 relative to the housing in the first direction 39, a user can re-apply a force on the drive initiator 22 and a force on the trigger 20 directed toward the grip 32 while maintaining the position of the housing 12, as described above, and prior to the trigger 20 arriving at its first position 43 and the drive initiator 22 arriving at its first position 63. This results in use of the drive assembly 19 in a uni-directional manner. The application and removal of a force can be repeated any suitable number of times to achieve movement of the drive assembly 19 in the first direction 39.

FIG. 12 illustrates the trigger 20 in the first position 43, the drive initiator 22 in the first position 63, the drive member 24 in the second position 73, the flip drive 26 in the neutral position 83, and the drive assembly 18 static relative to the housing 14.

Figure 13:
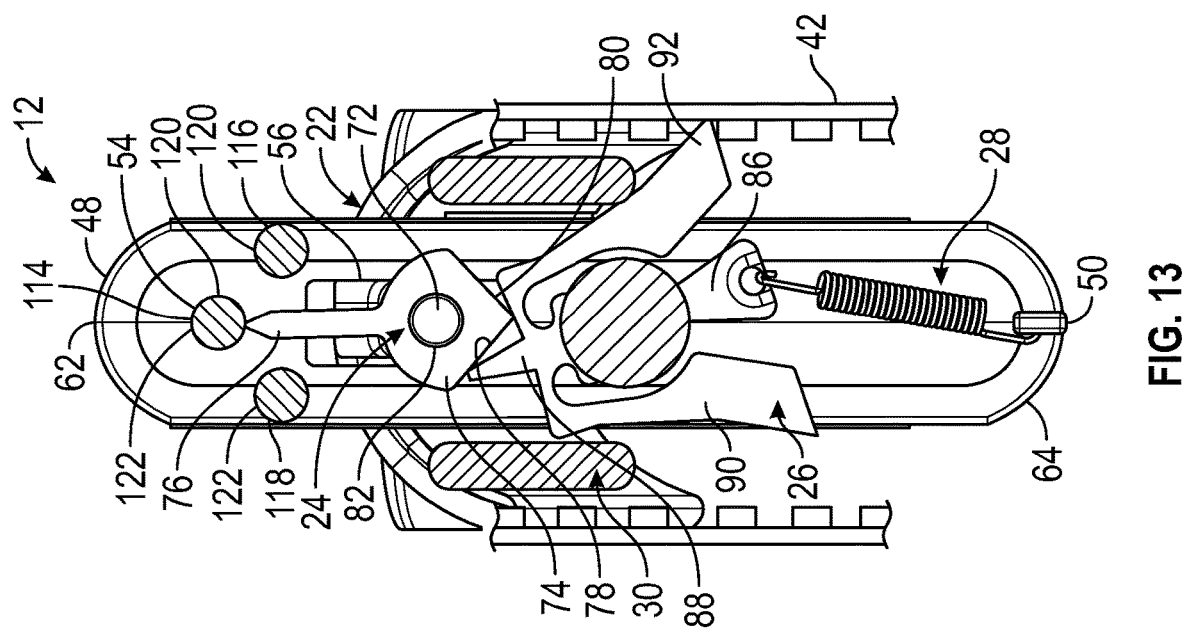
FIG. 13 is a partial sectional view of the medical device illustrated in FIG. 1. The trigger is in the first position, the drive initiator is between the first position and the second position, the drive member is between the first position and the second position, the flip drive is between the neutral position and the second drive position, and the drive assembly is static relative to the housing.

Upon the application of a force on the drive initiator 22 directed toward the grip 32 while maintaining the position of the housing 12, the drive initiator 22 advances toward its second position 65, the drive member 24 advances toward the flip drive 26, and the drive member 24 contacts the flip drive 26 and positions the flip drive 26 between the neutral position 83 and the second drive position 87. In the illustrated embodiment, the first surface 78 of the drive member 24 contacts the projection 88 of the flip drive 26, the drive member 24 contacts the second driver arm 92 of the flip drive 26, and the second driver arm 92 of the flip drive 26 contacts the drive belt 42 of the drive assembly 18. FIG. 13 illustrates the trigger 20 in the first position 43, the drive initiator 22 between the first position 63 and the second position 65, the drive member 24 between the first position 71 and the second position 73, the flip drive 26 between the neutral position 83 and the second drive position 87 and contacting the drive assembly 18 (e.g., drive belt 42), and the drive assembly 18 static relative to the housing 14.

By continuing the application of a force on the drive initiator 22 directed toward the grip 32 and applying a force on the trigger 20 directed toward the grip 32 while maintaining the position of the housing 12, the drive initiator 22 advances to its second position 65, the drive member 24 advances toward the flip drive 26, and the drive member 24 contacts the flip drive 26 and positions the flip drive 26 in the second drive position 87. In the illustrated embodiment, the first surface 78 of the drive member 24 contacts the projection 88 of the flip drive 26, the second surface 80 of the drive member 24 contacts the second driver arm 92 of the flip drive 26, and the second driver arm 92 of the flip drive 26 contacts the drive belt 42 of the drive assembly 18. The structural configuration of the flip drive 26 provides a mechanism for moving the drive member 24 between its second and first positions during use. FIG. 14 illustrates the trigger 20 between the first position 43 and the second position 45, the drive initiator 22 in the second position 65, the drive member 24 in the first position 71, the flip drive 26 in the second drive position 87 and contacting the drive assembly 18 (e.g., drive belt 42), and the drive assembly 18 moving relative to the housing 14 in a second direction 41.

Figure 15:
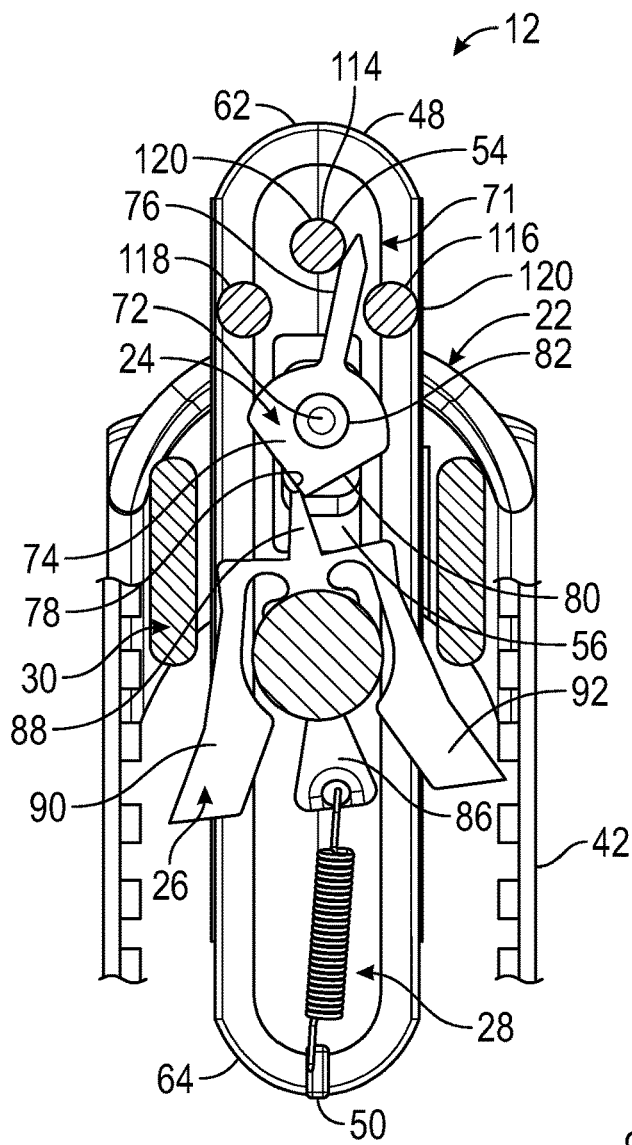
FIG. 15 is a partial sectional view of the medical device illustrated in FIG. 1. The trigger is between in the first position and the second position, the drive initiator is between the first position and the second position, the drive member is in the first position, the flip drive is between the second drive position and the neutral position, and the drive assembly is static relative to the housing.

The drive assembly 18 continues to move relative to the housing 14 in the second direction 41 as the trigger 20 is advanced to its second position 45. By releasing the application of a force on the drive initiator 22 and the trigger 20, the trigger 20 advances toward the first position 43 due to the bias of the coil member 44, the drive initiator 22 advances toward its first position 63, the drive member 24 advances away from the flip drive 26, and the drive member 24 positions the flip drive 26 between the neutral position 83 and the second drive position 87. In the illustrated embodiment, the first surface 78 of the drive member 24 contacts the projection 88 of the flip drive 26. FIG. 15 illustrates the trigger 20 between the first position 43 and the second position 45, the drive initiator 22 between the first position 63 and the second position 65, the drive member 24 in the first position 71, the flip drive 26 between the neutral position 83 and the second drive position 87, and the drive assembly 18 static relative to the housing 14. If it is desired to continue to move the drive assembly 19 relative to the housing in the second direction 41, a user can re-apply a force on the drive initiator 22 and a force on the trigger 20 directed toward the grip 32 while maintaining the position of the housing 12, as described above, and prior to the trigger 20 arriving at its first position 43 and the drive initiator 22 arriving at its first position 63. This results in use of the drive assembly 19 in a uni-directional manner. The application and removal of a force can be repeated any suitable number of times to achieve movement of the drive assembly 19 in the first direction 41.

Figure 16:
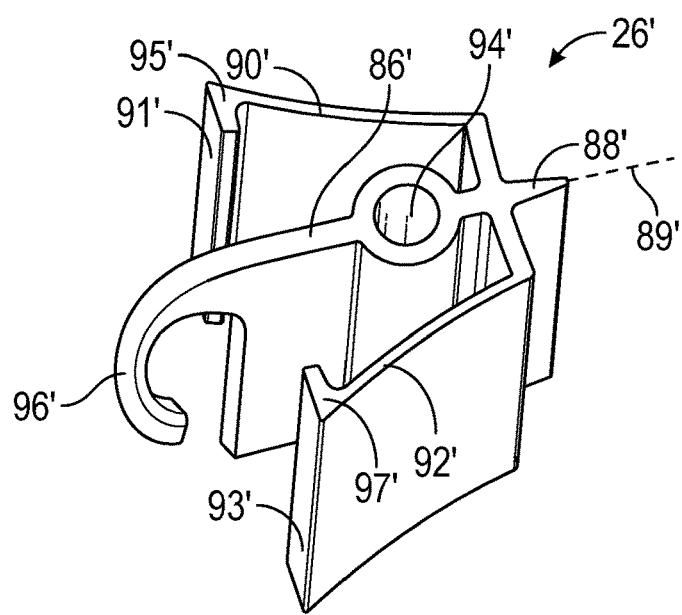
FIG. 16 is a perspective view of another example flip drive that can be included in a medical device.

FIG. 16 illustrates another example flip drive 26' that can be included in a medical device. The flip drive 26' is similar to the flip drive 26 illustrated in FIGS. 1 through 15 and described above, except as detailed below.

In the illustrated embodiment, the flip drive 26' has a lengthwise axis 89', a central portion 86', a projection 88', a first driver arm 90', and a second driver arm 92'. The central portion 86' defines a first passageway 94' through which a projection of a retaining cap can be disposed and a hook 96' to which a portion of a biasing member can be attached. The projection 88' extends from the central portion 86' and each of the first and second driver arms 90', 92' is moveably attached to the central portion 86' using a living hinge. In the embodiment shown, the first driver arm 90' includes a first projection 91' and the second driver arm 92' includes a second projection 93'. The first projection 91' extends from the end 95' of the first driver arm 90' and towards the central portion 86' and the second projection 93' extends from the end 97' of the second driver arm 92' and towards the central portion 86'.

Figure 17:
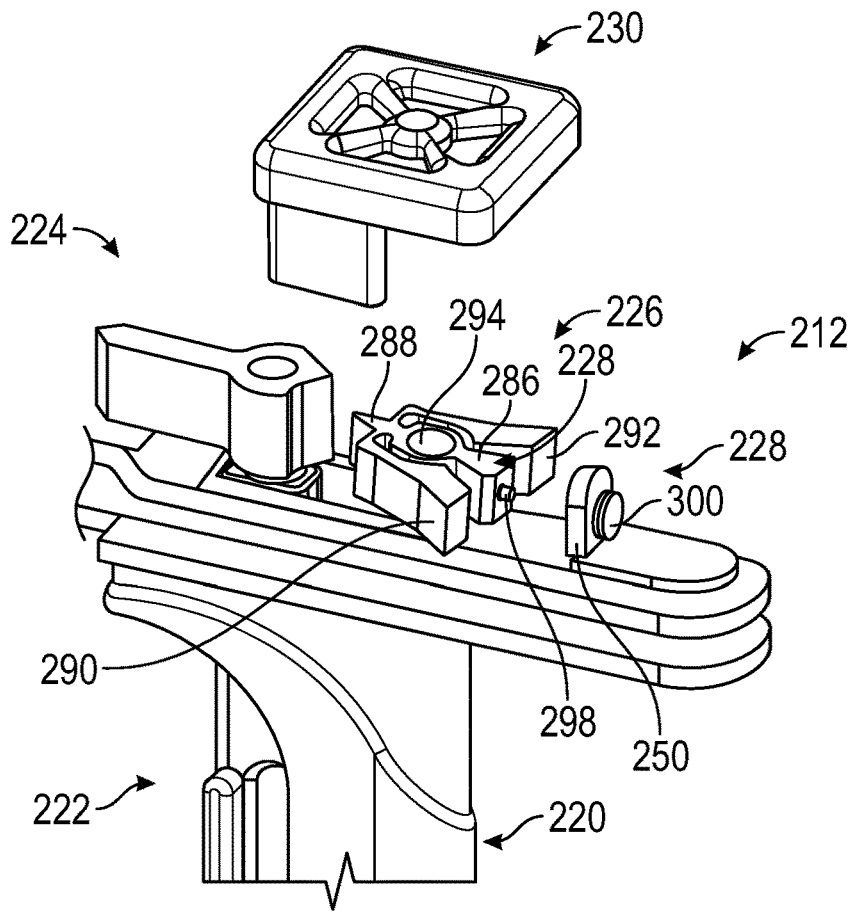
FIG. 17 is a partial exploded perspective view of another example trigger assembly that can be included in a medical device.

FIG. 17 illustrates another example trigger assembly 212 that can be included in a medical device. The trigger assembly 212 is similar to the trigger assembly 12 illustrated in FIGS. 1 through 15 and described above, except as detailed below. In the illustrated embodiment, the trigger assembly 212 includes a trigger 220, a drive initiator 222, a drive member 224, a flip drive 226, a biasing member 228, and a retaining cap 230.

In the illustrated embodiment, the drive member 224 is moveably attached to the drive initiator 222 and is moveable relative to the trigger 220 and the flip drive 224 between first and second positions.

The flip drive 226 is moveably attached to the trigger 220 and is moveable between a neutral position, a first drive position, and a second drive position. FIG. 17 illustrates the flip drive in the neutral position. The flip drive 226 has a central portion 286, a projection 288, a first driver arm 290, and a second driver arm 292. The central portion 286 defines a first passageway 294 through which a portion of the retaining cap 230 is disposed and a second passageway 296 within which a first magnet 298 of the biasing member 228 is disposed. The projection 288 extends from the central portion 286, toward the drive member 224, and is adapted to contact the drive member 224.

The biasing member 228 is attached to the trigger 220 and the flip drive 226 as biases the flip drive 226 to the neutral position 283. In the illustrated embodiment, the biasing member 228 includes a first magnet 298 and a second magnet 300. The first magnet 298 is disposed within the second passageway 296 defined by the flip drive 226 and is attached to the flip drive 226. The second magnet 300 is attached to the projection 250 of the trigger 220.

Figure 18:
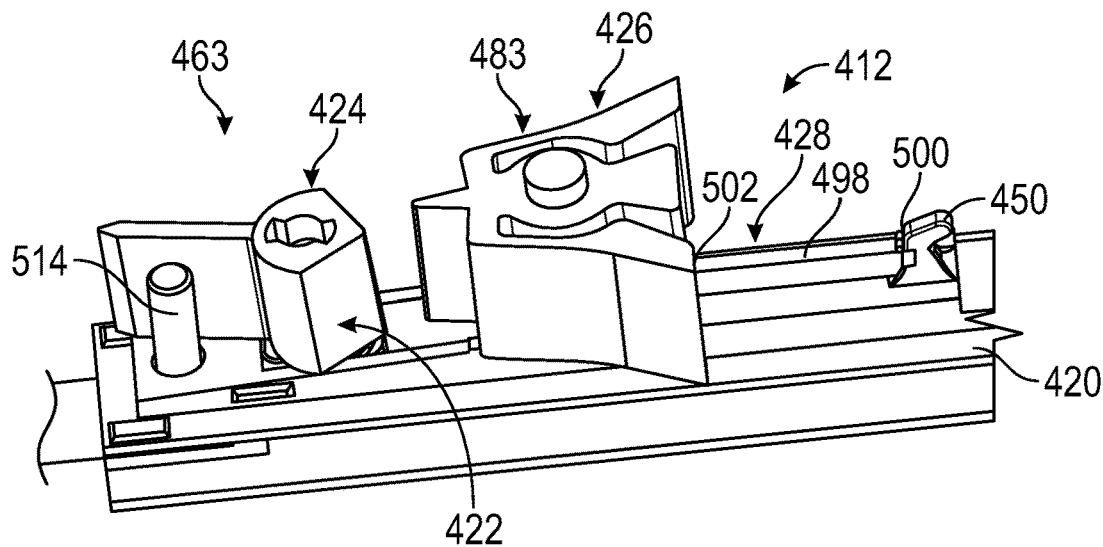
FIG. 18 is a partial perspective view of another example trigger assembly that can be included in a medical device.

FIG. 18 illustrates another example trigger assembly 412 that can be included in a medical device. The trigger assembly 412 is similar to the trigger assembly 12 illustrated in FIGS. 1 through 15 and described above, except as detailed below. In the illustrated embodiment, the trigger assembly 412 includes a trigger 420, a drive initiator 422, a drive member 424, a flip drive 426, and a biasing member 428.

In the illustrated embodiment, the trigger assembly 412 includes a single guide peg 514 that is disposed on the trigger 420, which provides a mechanism to move the drive member 424 between its first and second positions, as described herein. In addition, in the embodiment illustrated, the biasing member 428 is attached to the trigger 420 and the flip drive 426 as biases the flip drive 426 to the neutral position 483 when the drive initiator 422 is in the first position 463. In the illustrated embodiment, the biasing member 428 is an elongate member 498 that has a first end 500 attached to the projection 450 of the trigger 420 and a second end 502 that is attached to the flip drive 424. The biasing member 428 can include any suitable structural arrangement (e.g., weakened portions, portions with a reduced thickness) to accomplish biasing the flip drive 426 to its neutral position 483 while allowing the flip drive 426 to move between the neutral position 483, the first drive position, and the second drive position, as described herein.

While the medical devices that include a trigger assembly for a rotatable catheter, and their associated components, have been illustrated herein as having particular structural arrangements, other structural arrangements are considered suitable and a medical device that includes a trigger assembly for a rotatable catheter, and any associated component, can be formed of any suitable material and using any suitable technique or method of manufacture. Selection of a suitable structural arrangement, material, and/or suitable technique or method of manufacture can be based on various considerations, including the intended use of the medical device that includes a trigger assembly for a rotatable catheter. Examples of materials considered suitable to form a medical device that includes a trigger assembly for a rotatable catheter, and/or any component of a medical device that includes a trigger assembly for a rotatable catheter, include biocompatible materials, materials that can be made biocompatible, braided materials, coiled materials, metals, such as 316 stainless and 304 stainless, Nitinol, corrosion resistant materials, plastics, polymers, polyethylene, such as high-density polyethylene (HDPE), polypropylene, polycarbonates, silicone, Delrin, transparent materials, opaque materials, combinations of the materials described herein, layered materials, and any other material considered suitable for a particular embodiment.

The trigger assemblies described herein are considered advantageous relative to previous trigger assemblies at least because the position of a drive member (e.g., drive member 24) can be maintained prior to engagement with a flip drive (e.g., flip drive 26) through use of one or more guide pegs, as described herein. In addition, the structural arrangement and fit between a drive member and a flip drive: 1) increases the surface area of a drive member that contacts a flip drive during use; 2) allows a user to maintain the directionality of the drive assembly when a trigger is moved to its second position and it is prevented from returning to its first position; and 3) provides an efficient transition of the drive member between its first and second positions during use. Furthermore, the position of a tail of a drive member relative to one or more guide pegs can be alternated and maintained every time a trigger is advanced to its second position. Each of these advantages increases the efficiency of the movement of the drive assembly between its first and second directions, reducing the time required to complete a procedure and the hand fatigue experienced by a user during use of the medical device.

Various methods of using a medical device that includes a trigger assembly for a rotatable catheter are described herein. While the methods described herein are shown and described as a series of acts, it is to be understood and appreciated that the methods are not limited by the order of acts, as some acts may in accordance with these methods, occur in the order shown and/or described, in different orders, and/or concurrently with other acts described herein.

Figure 19:
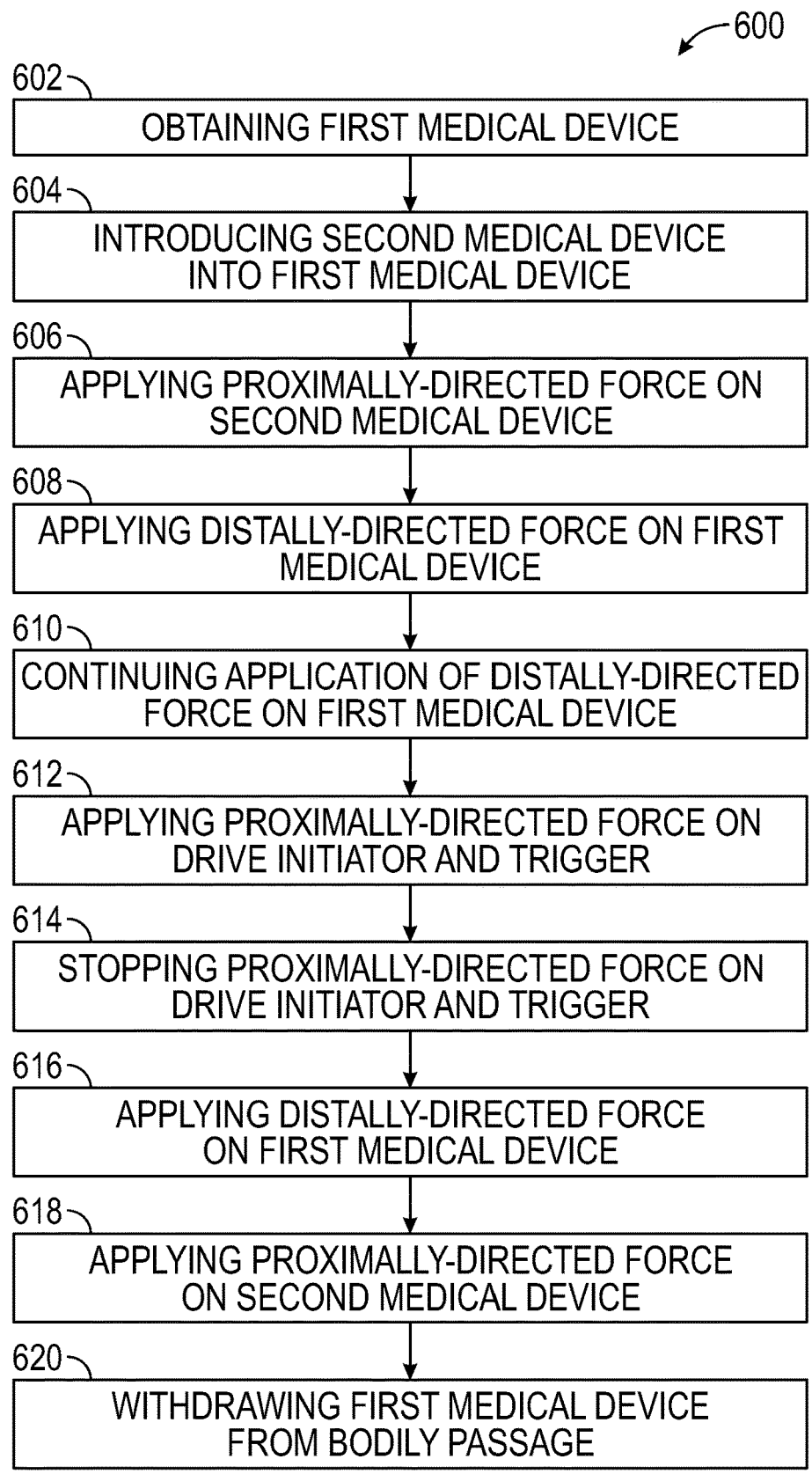
FIG. 19 is a schematic illustration of an example method of using a medical device that includes a trigger assembly for a rotatable catheter.

FIG. 19 is a schematic illustration of an example method 600 of using a first medical device that includes a trigger assembly for a rotatable catheter. Method 600 can be used to remove a second medical device attached to a portion of a body of an animal, such as a human. The second medical device can be disposed within a bodily passage of the body of the animal.

A step 602 comprises obtaining a first medical device that includes a trigger assembly for a rotatable catheter that has a housing, a catheter, a drive assembly, and a trigger assembly. The trigger assembly includes a trigger, a drive initiator, a drive member, a flip drive, a biasing member, and a retaining cap. The drive member is in the first position. Another step 604 comprises introducing a portion of a second medical device disposed within a bodily passage of a body of an animal into a lumen defined by the catheter. Another step 606 comprises applying a proximally-directed force on the second medical device while maintaining the position of the first medical device until the second medical device is disposed proximal to the catheter. Another step 608 comprises applying a distally-directed force on the first medical device while applying proximally-directed force on the second medical device such that the first medical device is introduced into the bodily passage (e.g., vessel). Another step 610 comprises continuing the application of a distally-directed force on the first medical device while applying proximally-directed force on the second medical device such that the first medical device is advanced into the bodily passage. Another step 612 comprises applying a proximally-directed force on the drive initiator and the trigger while maintaining the position of the grip such that the drive member moves to the second position, the flip drive contacts a portion of the drive assembly, and the catheter rotates and dissects tissue (e.g., encapsulated tissue) from the second medical device. Another step 614 comprises stopping the application of a proximally-directed force on the drive initiator and trigger. Another step 616 comprises applying a distally-directed force on the first medical device while applying a proximally-directed force on the second medical device such that the first medical device is advanced into the bodily passage. Another step 618 comprises applying a proximally-directed force on the second medical device while maintaining the position of the first medical device until the second medical device is withdrawn from the bodily passage. Another step 620 comprises applying a proximally-directed force on the first medical device until the first medical device (e.g., catheter) is withdrawn from the bodily passage.

Optional steps that can be completed prior to step 602 when completing a superior approach (e.g., through the subclavian vein) include: surgically exposing a proximal end of the second medical device; removing the second medical device from any connections; removing any suture and/or tie-down materials attached to, or disposed over, the second medical device; removing any proximal fittings attached to the second medical device; introducing a wire guide into a lumen defined by the second medical device; advancing the wire guide through lumen of the second medical device to confirm patency of the lumen defined by the second medical device; withdrawing the wire guide from the lumen defined by the second medical device; introducing a locking stylet into the lumen defined by the second medical device; advancing the locking stylet to the distal end of the second medical device; locking the locking stylet in place; when the second medical device comprises an active fixation type lead, another optional step comprises applying torque to the second medical device to unscrew the second medical device from tissue (e.g., cardiac tissue).

Step 602 can be accomplished using any suitable medical device that includes a trigger assembly for a rotatable catheter, such as those described herein. For example, medical device 10 illustrated in FIGS. 1 through 15, a medical device that includes the flip drive 26' illustrated in FIG. 16, a medical device that includes the trigger assembly 212 illustrated in FIG. 17, or a medical device that include the trigger assembly 412 illustrated in FIG. 18 can be used.

Step 604 can be accomplished by inserting any suitable portion of any suitable second medical device into a lumen defined by the catheter. A second medical device used to complete method 600 has a proximal end, a distal end, and defines a lumen within which multiple components are disposed. For example, a second medical device can comprise a cardiac lead that extends from the proximal end, which can be disposed outside of a bodily passage (e.g., subclavian vein), through the bodily passage (e.g., subclavian vein, superior vena cava, and right cardiac chamber(s)), to the distal end. The distal end of the second medical device is attached to tissue (e.g., cardiac tissue within right atrium, cardiac tissue within right ventricle). While a cardiac lead has been described as an example of a second medical device that can be used to complete method 600, the medical devices that include a trigger assembly for a rotatable catheter described herein can be used on any suitable tubular member and/or second medical device disposed within a body.

In an alternative embodiment, step 602 can be omitted and step 604 can comprise introducing a portion of a second medical device disposed within a bodily passage of a body of an animal into a lumen defined by a catheter of a first medical device. The first medical device includes a trigger assembly for a rotatable catheter that has a housing, the catheter, a drive assembly, and a trigger assembly. The trigger assembly includes a trigger, a drive initiator, a drive member, a flip drive, a biasing member, and a retaining cap. The drive member is in the first position.

Step 606 can alternatively comprise applying a proximally-directed force on the second medical device while applying a distally-directed force on the first medical device until the second medical device is disposed proximal to the catheter or comprise applying a distally-directed force on the first medical device while maintaining the position of the second medical device until the second medical device is disposed proximal to the catheter.

Step 608 can be accomplished by introducing the first medical device into any suitable bodily passage and such that the first medical device is tracked over the second medical device, which is disposed within the lumen defined by the catheter, and the catheter is introduced into the bodily passage. Examples of bodily passages within which it is considered suitable to introduce a first medical device, such as those described herein, include veins, such as the subclavian vein, arteries, and any other bodily passage considered suitable for a particular embodiment.

Step 610 can be accomplished by advancing the first medical device over the second medical device and into any suitable bodily passage such that the catheter is advanced into the bodily passage. Examples of bodily passages within which it is considered suitable to advance a first medical device, such as those described herein, include the veins, such as the subclavian vein, the superior vena cava, arteries, the right atrium, the right ventricle, and any other bodily passage considered suitable for a particular embodiment.

Step 612 can be accomplished in instances in which the first medical device encounters tissue encapsulation (e.g., calcification, fibrous tissue) while being tracked over the second medical device. Alternatively, in embodiments in which tissue encapsulation is not encountered, step 612 and step 614 can be omitted from method 600. An optional step that can be completed concurrently with step 612 comprises applying a proximally-directed force on the first medical device or a distally-directed force on the first medical device. Optionally, step 612 can be repeated any suitable number of times, such as when any additional tissue encapsulation and/or calcification is encountered. If repeated, the application of a proximally-directed force on the drive initiator and the trigger while maintaining the position of the grip results in the drive member moving between its first and second positions, contact between the flip drive and a portion of the drive assembly, and rotation of the catheter such that it dissects tissue (e.g., encapsulated tissue) from the second medical device.

Step 616 can be accomplished as described above with respect to step 608.

Any of the steps described in method 600 can be accomplished while visualizing the first medical device, the second medical device, the bodily passage, and/or tissue using any suitable technique or method of visualization. For example, any of the steps described in method 600 can be accomplished under fluoroscopic monitoring.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular arrangement of elements and steps disclosed herein have been selected by the inventor(s) simply to describe and illustrate examples of the invention and are not intended to limit the scope of the invention or its protection, which is to be given the full breadth of the appended claims and any and all equivalents thereof.

What is claimed is:

1. A medical device comprising:
    a housing defining a chamber and a passageway in communication with the chamber;
    a catheter partially disposed through the passageway and rotatable relative to the housing;
    a drive assembly disposed within the chamber and moveable relative to the housing, movement of the drive assembly resulting in rotation of the catheter; and
    a trigger assembly partially disposed within the chamber, the trigger assembly comprising:
        a trigger attached to the housing and moveable between a first position and a second position relative to the housing;
        a drive initiator attached to the trigger and moveable between a first position and a second position relative to the trigger;
        a drive member attached the drive initiator and moveable relative to the trigger between a first position and a second position;
        a flip drive attached to the trigger and moveable between a neutral position, a first drive position, and a second drive position, the flip drive in the neutral position when the drive initiator is in the first position, the flip drive in the first drive position when the drive initiator is in the second position and the drive member is in the second position, the flip drive in the second drive position when the drive initiator is in the second position and the drive member is in the first position; and
        a biasing member disposed within the chamber and biasing the flip drive to the neutral position when the drive initiator is in the first position;
        wherein the drive assembly moves relative to the housing when the flip drive is in the first drive position and the trigger is moved from its first position to its second position; and
        wherein the drive assembly moves relative to the housing when the flip drive is in the second drive position and the trigger is moved from its first position to its second position.

2. The medical device of claim 1, wherein the drive member moves relative to the flip drive.

3. The medical device of claim 1, wherein the drive assembly is moveable relative to the housing in a first direction and a second direction such that movement of the drive assembly in the first direction results in rotation of the catheter in a clockwise direction and movement of the drive assembly in the second direction results in rotation of the catheter in a counterclockwise direction.

4. The medical device of claim 3, wherein the drive assembly moves relative to the housing in the first direction when the flip drive is in the first drive position and the trigger is moved from its first position to its second position; and
    wherein the drive assembly moves relative to the housing in the second direction when the flip drive is in the second drive position and the trigger is moved from its first position to its second position.

5. The medical device of claim 1, wherein the catheter is partially disposed within the chamber.

6. The medical device of claim 1, wherein the flip drive has a central portion, a first driver arm, and a second driver arm, each of the first driver arm and the second driver arm moveably attached to the central portion.

7. The medical device of claim 6, wherein the first driver arm is attached to the central portion using a living hinge.

8. The medical device of claim 7, wherein the second driver arm is attached to the central portion using a living hinge.

9. The medical device of claim 6, wherein the flip drive is formed of a single, continuous piece of material.

10. The medical device of claim 1, wherein the trigger assembly further comprises a retaining cap attached to the trigger.

11. The medical device of claim 10, wherein the flip drive defines a passageway; and
wherein the retaining cap defines a projection disposed within the passageway defined by the flip drive.

12. The medical device of claim 10, wherein the retaining cap defines a plurality of guide pegs.

13. The medical device of claim 12, wherein a portion of the drive member is disposed between a first set of guide pegs of the plurality of guide pegs when the drive member is in the first position; and
wherein the portion of the drive member is disposed between a second set of guide pegs of the plurality of guide pegs of the plurality of guide pegs when the drive member is in the second position, the second set of guide pegs being different from the first set of guide pegs.

14. The medical device of claim 1, wherein the biasing member is attached to the flip drive and the trigger.

15. The medical device of claim 14, wherein the biasing member comprises an extension spring.

16. The medical device of claim 1, wherein the biasing member comprises a first magnet attached to the flip drive and a second magnet attached to the trigger.

17. The medical device of claim 1, wherein the flip drive contacts a portion of the drive assembly when the flip drive is in the first drive position.

18. The medical device of claim 1, wherein the flip drive contacts a portion of the drive assembly when the flip drive is in the second drive position.

19. A medical device comprising:
a housing defining a chamber and a passageway in communication with the chamber;
a catheter partially disposed through the passageway and rotatable relative to the housing;
a drive assembly disposed within the chamber and moveable relative to the housing, movement of the drive assembly resulting in rotation of the catheter; and
a trigger assembly partially disposed within the chamber, the trigger assembly comprising:
a trigger attached to the housing and moveable between a first position and a second position relative to the housing;
a drive initiator attached to the trigger and moveable between a first position and a second position relative to the trigger;
a biasing member that extends from a handle of the trigger toward the drive initiator and biases the drive initiator to the first position;
a drive member attached the drive initiator and moveable relative to the trigger between a first position and a second position;
a flip drive attached to the trigger and moveable between a neutral position, a first drive position, and a second drive position, the flip drive in the neutral position when the drive initiator is in the first position, the flip drive in the first drive position when the drive initiator is in the second position and the drive member is in the second position, the flip drive in the second drive position when the drive initiator is in the second position and the drive member is in the first position, the flip drive having a central portion, a first driver arm, and a second driver arm, each of the first driver arm and the second driver arm moveably attached to the central portion, each of the first driver arm and second driver arm attached to the central portion using a living hinge; and
an extension spring attached to the flip drive and the trigger and biasing the flip drive to the neutral position when the drive initiator is in the first position; wherein the drive assembly moves relative to the housing when the flip drive is in the first drive position and the trigger is moved from its first position to its second position; and
wherein the drive assembly moves relative to the housing when the flip drive is in the second drive position and the trigger is moved from its first position to its second position.

20. A medical device comprising:
a housing defining a chamber and a passageway in communication with the chamber;
a catheter partially disposed through the passageway and rotatable relative to the housing;
a drive assembly disposed within the chamber and moveable relative to the housing, movement of the drive assembly resulting in rotation of the catheter; and
a trigger assembly partially disposed within the chamber, the trigger assembly comprising:
a trigger attached to the housing and moveable between a first position and a second position relative to the housing;
a drive initiator attached to the trigger and moveable between a first position and a second position relative to the trigger;
a drive member attached the drive initiator and moveable relative to the trigger between a first position and a second position;
a flip drive attached to the trigger and moveable between a neutral position, a first drive position, and a second drive position, the flip drive in the neutral position when the drive initiator is in the first position, the flip drive in the first drive position when the drive initiator is in the second position and the drive member is in the second position, the flip drive in the second drive position when the drive initiator is in the second position and the drive member is in the first position, the flip drive formed of a single, continuous piece of material and having a central portion, a first driver arm, and a second driver arm, each of the first driver arm and the second driver arm moveably attached to the central portion, each of the first driver arm and second driver arm attached to the central portion using a living hinge;
an extension spring attached to the flip drive and the trigger and biasing the flip drive to the neutral position when the drive initiator is in the first position; and
a retaining cap attached to the trigger, the retaining cap defining a plurality of guide pegs;
wherein the drive assembly moves relative to the housing in a first direction when the flip drive is in the first drive position and the trigger is moved from its first position to its second position;
wherein the drive assembly moves relative to the housing in a second direction when the flip drive is in the second drive position and the trigger is moved from its first position to its second position, the second direction different than the first direction;
wherein a portion of the drive member is disposed between a first set of guide pegs of the plurality of guide pegs when the drive member is in the first position; and wherein the portion of the drive member is disposed between a second set of guide pegs of the plurality of guide pegs of the plurality of guide pegs when the drive member is in the second position, the second set of guide pegs different than the first set of guide pegs.

\* \* \* \* \*